United States Patent [19]

Best et al.

[11] Patent Number: 4,897,178

[45] Date of Patent: Jan. 30, 1990

[54] HYDROCRACKING CATALYST AND HYDROCRACKING PROCESS

[75] Inventors: Donald F. Best, Mahopac; Gary N. Long, Putnam Valley; Regis J. Pellet, Cronton-on-Hudson; Jule A. Rabo, Armonk; Edward T. Wolynic, Scarsdale; Frank P. Gortsema, Pleasantville; Albert R. Springer, Mt. Vernon, all of N.Y.

[73] Assignee: UOP, Des Plaines, Ill.

[21] Appl. No.: 143,473

[22] Filed: Jan. 13, 1988

Related U.S. Application Data

[63] Continuation-in-part of Ser. No. 764,618, Aug. 12, 1985, Pat. No. 4,735,928, which is a continuation of Ser. No. 490,951, May 2, 1983, abandoned.

[51] Int. Cl.$^4$ .................. C10G 47/20; C10G 69/10
[52] U.S. Cl. ........................ 208/111; 208/89
[58] Field of Search ............... 208/111, 112, 114, 89; 502/79, 86

[56] References Cited

U.S. PATENT DOCUMENTS

| | | | |
|---|---|---|---|
| Re. 28,629 | 11/1975 | Maher et al. | 423/112 |
| 3,130,007 | 4/1964 | Breck | 23/113 |
| 3,293,192 | 12/1966 | Maher et al. | 252/430 |
| 3,402,996 | 9/1968 | Maher et al. | 23/112 |
| 3,493,519 | 2/1970 | Kerr et al. | 252/455 |
| 3,506,400 | 4/1970 | Eberly, Jr. et al. | 23/182 |
| 3,513,108 | 5/1970 | Kerr | 252/455 |
| 3,591,488 | 7/1971 | Eberly, Jr. et al. | 208/111 |
| 3,594,331 | 7/1971 | Elliott, Jr. | 252/442 |
| 3,640,681 | 2/1972 | Pickert | 23/111 |
| 3,691,099 | 9/1972 | Young | 252/450 |
| 3,702,886 | 11/1972 | Argauer et al. | 423/328 |
| 3,758,403 | 9/1973 | Rosinski et al. | 208/120 |
| 3,871,993 | 3/1975 | Morrison | 208/135 |
| 3,894,934 | 7/1975 | Owen et al. | 208/78 |
| 3,933,983 | 1/1976 | Elliott, Jr. | 423/328 |
| 3,972,983 | 8/1976 | Ciric | 423/328 |
| 4,036,739 | 7/1977 | Ward | 208/120 |
| 4,093,560 | 6/1978 | Kerr et al. | 252/455 |
| 4,239,654 | 12/1980 | Gladrow | 502/67 |
| 4,242,237 | 12/1980 | Gladrow et al. | 502/65 |
| 4,419,271 | 12/1983 | Ward | 502/79 |
| 4,503,023 | 3/1985 | Breck et al. | 423/328 |
| 4,517,073 | 5/1985 | Ward et al. | 208/111 |
| 4,588,496 | 5/1986 | Scherzer | 502/79 |
| 4,604,373 | 8/1986 | Clark | 502/79 |
| 4,666,693 | 5/1987 | Ross et al. | 423/328 |
| 4,672,048 | 6/1987 | Ward | 502/79 |
| 4,699,708 | 10/1987 | Dejsan | 208/111 |
| 4,711,770 | 12/1987 | Skeels et al. | 423/328 |
| 4,735,928 | 4/1988 | Best et al. | 502/65 |
| 4,781,815 | 11/1988 | Pellet et al. | 208/111 |

FOREIGN PATENT DOCUMENTS

1431944  4/1976  United Kingdom ............ 502/79

*Primary Examiner*—Anthony McFarlane
*Attorney, Agent, or Firm*—Vincent J. Vasta, Jr.

[57] ABSTRACT

A process for hydrocracking a crude oil feed, a hydrocracking catalyst employed therein, and a process for the preparation of this catalyst are disclosed. The hydrocracking catalyst comprises a zeolitic aluminosilicate which has an $SiO_2/Al_2O_3$ molar ratio of at least 6 and which has been treated by (i) thermal treatment at an effective temperature and for an effective time in the presence of steam, followed by (ii) ion-exchange with a solution containing ammonium ion; and (2) an effective amount of a hydrogenation component. In a preferred embodiment, the starting crystalline zeolitic aluminosilicate is a Y-type zeolite having an $SiO_2/Al_2O_3$ molar ratio of at least about 9 and a unit cell dimension ($a_o$) of less than about 24.55 Å, and the steam treatment is carried out for a period sufficient to cause a decrease of not more than about 0.1 Å in the unit cell dimension, thereby producing a Y-type zeolite product having a $SiO_2/Al_2O_3$ molar ratio of at least about 9 and a unit cell dimension of less than about 24.45 Å.

54 Claims, 4 Drawing Sheets

HYDROCRACKING CATALYST AND HYDROCRACKING PROCESS

CROSS-REFERENCE TO RELATED APPLICATIONS

This application is a continuation-in-part of application Ser. No. 764,618, filed Aug. 12,1985, now U.S. Pat. No. 4,735,928, which in turn is a continuation of application Ser. No. 490,951, filed May 2, 1983 and now abandoned.

FIELD OF THE INVENTION

The present invention relates to a hydrocracking catalyst, its preparation and its process of use in hydrocracking processes.

BACKGROUND OF THE INVENTION

Hydrocracking catalysts and hydrocracking processes (that is to say processes in which hydrocarbon feedstocks undergo chemical reactions in the presence of hydrogen and an appropriate catalyst to produce lower boiling hydrocarbons, at least part of which is useful as motor fuels such as turbine fuel, diesel oil and gasoline) are well-known in the prior art. The literature on such catalysts and processes is quite extensive. Certain technical areas have been addressed as of particular interest as is readily apparent based on the large numbers of patents on certain technical topics, e.g., the use of certain zeolites as cracking catalysts. Representatives of the patents in this area are the ZSM patents which include: U.S. Patent No. 3,894,934 (ZSM-5); U.S. Pat. Nos. 3,871,993 (ZSM-5, ZSM-11, ZSM-12 and ZSM-21); U.S. Pat. No. 3,702,886 (ZSM-5); and U.S. Pat. No. 3,758,403 (ZSM-5 in combination with zeolite Y) and U.S. Pat. No. 3,972,983 (ZSM-20).

Although the aforementioned patents on the use of ZSM-type zeolites in hydrocracking catalysts are of interest, the use of these zeolites has not been of significant commercial interest to date. The commercially significant activity in the hydrocracking area has been for the most part directed to further elaboration on the basic hydrocracking technology which has arisen in relation to zeolite Y, as disclosed in U.S. Pat. No. 3,130,007.

The development of hydrocracking catalysts based on a Y-type zeolite has taken many directions. Illustrative of the various processes which have arisen are those disclosed in the following patents:

U.S. Pat. No. 3,293,192 discloses a synthetic ultra stable zeolitic aluminosilicate of the Y-type (see U.S. Pat. No. 3,594,331 which discloses that Z-14HS is zeolite Y) which has been prepared by calcining a low alkali metal Y zeolite and successively base exchanging the calcined product with a base solution containing ammonium or complex amino salts until the alkali content is less than 1 weight percent, and then calcining this product.

U.S. Pat. No. 3,493,519 discloses a process for calcining an ammonium-Y zeolite in the presence of rapidly-flowing steam followed by base exchange and treatment of the product with a chelating agent capable of combining with aluminum whereby aluminum is extracted from zeolite Y.

U.S. Pat. No. 3,506,400 discloses an improved process for extracting aluminum from a zeolite similar to that disclosed in U.S. Pat. 3,493,519. The improvement is to employ mineral acids in the aluminum extraction process.

U.S. Pat. No. 3,513,108 discloses a process for improving the hydrothermal stability of aluminosilicates by subjecting the hydrogen form of the aluminosilicate to calcination in an inert atmosphere with the resulting water, generated as a result of the calcination, being allowed to react with the resultant crystalline aluminosilicate.

U.S. Pat. No. 3,594,331 discloses a process for treating a crystalline aluminosilicate by treating the zeolite with a soluble fluoride salt. The process is disclosed to be a stabilization process wherein fluoride becomes associated with structural $Na_2O$.

U.S. Pat. No. 3,640,681 discloses a process for extracting aluminum from the framework of a crystalline zeolitic molecular sieve by use of acetylacetone and a metal acetylacetonate as extractants.

U.S. Pat. No. 3,691,099 discloses a process for extracting aluminum from a crystalline zeolitic aluminosilicate by use of an acidic solution containing at least one water soluble salt which reacts with aluminum atoms of the zeolite.

U.S. Pat. No. 3,933,983 discloses a process similar to the process of U.S. Pat. No. 3,594,331 except that a cation exchange step is added after the fluoride treatment step.

U.S. Pat. No. 4,093,560 discloses a process for dealuminizing a zeolite, i.e, extracting aluminum therefrom by treatment with an acidic slurry of an ammonium or alkali metal salt which upon acidification complexes aluminum. The aluminum removal process destroys at least a portion of the crystallinity of the support material.

U.S. Pat. No. 4,242,237 discloses a catalyst comprising a mixture of a Y-type zeolite and a small pore zeolite, e.g. zeolite A.

U.S. Pat. No. 4,517,073 describes a hydrocracking process, which is said to be of especial use in the production of a relatively high yield of middle distillate products along with a smaller but still significant yield of gasoline from high boiling gas oils and the like. The process comprises contacting a gas oil or other hydrocarbon feedstock under hydrocracking conditions with a catalyst comprising one or more hydrogenation components on a support material comprising, in combination, a dispersion of silica-alumina in alumina and "a zeolite of the Y crystalline structure but having a silica-to-alumina ratio above about 6.0." The zeolite used in the catalyst may be produced as described in U.S. Pat. No. 4,503,023 (discussed above), and the zeolite may be subjected to steaming and ammonium ion exchange before use in the hydrocracking process.

It is also known that the steam and thermal stability of zeolites can be improved by the use of zeolites having a low level of alkali metal content and a unit cell size less than about 24.45 Å; see U.S. Pat. No. 3,293,192 and Reissue No. 28,629, a reissue of Pat. No. 3,402,996.

U.S. Pat. No. 3,591,488 discloses that the hydrogen or ammonium form of a zeolite may be treated with $H_2O$ at a temperature ranging from about 800° to about 1500° F. (about 427. to about 816° C.), and thereafter cation-exchanged with cations including rare earth cations. The treated zeolite is intended for use as a cracking (not hydrocracking) catalyst.

U.S. Pat. No. 4,036,739 disclose a hydrothermally stable and ammonia stable Y-type zeolite intended for use as a cracking catalyst. The zeolite is prepared by partial exchange of ammonium ions for sodium ions, steam calcination under controlled conditions of time, temperature and steam partial pressure, and a second ion-exchange of ammonium ions for sodium ions to reduce the final $Na_2O$ content to below about 1 weight percent. Following the second ion-exchange, the zeolite is calcined for a time sufficient to effect substantial deammoniation but insufficient to reduce the unit cell dimension to below about 24.40 Å. According to U.S. Pat. No. 3,781,199, the second calcination may be conducted after the zeolite is admixed with a refractory oxide.

The above patents are illustrative of the state of the hydrocracking art. Although there has been extensive development of Y-type hydrocracking catalysts there has been little development of truly new hydrocracking catalysts. This paradox, the lack of new catalytic materials despite the sizable economic interest, is readily understood by an appreciation of the fact that the work horse of the commercial hydrocracking business is zeolite Y. As a result, the patent literature discloses the clear preference towards improving zeolite Y.

The existence of zeolite Y and its use as a catalyst for hydrocracking processes is now well accepted if not, in fact, legendary. Still, the state of the art relating to zeolite Y and its use in hydrocracking catalysts has been generally limited to ion-exchange techniques, aluminum extraction techniques and other secondary treatment processes which tend to remove aluminum from zeolite Y. Such aluminum deficient products necessarily contain significant levels of defect structure (hereinafter defined) as a result of the extraction of aluminum and as a result should have the common deficiencies observed in such materials, including reduced chemical and thermal stabilities which ultimately result in reduced catalyst life and activity. What is missing in the prior art is a new form of zeolite Y wherein zeolite Y, has in fact been modified in a way other than by only extracting aluminum to lower the aluminum content with the resulting increase in the concentration of defects in the crystal structure. Such a composition would be unique in its structure and in its utility as a hydrocracking catalyst.

U.S. Pat. No. 4,503,023 to Breck describes a process for dealuminizing a zeolite by treatment of the zeolite with a fluorosilicate salt in an amount of at least 0.0075 moles per 100 grams of the zeolite (on an anhydrous basis), the fluorosilicate salt being provided in the form of an aqueous solution having a pH in the range of 3 to about 7. The aqueous solution of the fluorosilicate salt is brought into contact with the zeolite at a rate sufficiently slow to preserve at least 80 percent, preferably at least 90 percent of the crystallinity of the starting zeolite and silicon atoms, as $SiO_4$ tetrahedra, are inserted into the crystal lattice in substitution for aluminum atoms. The fluorosilicate extracts aluminum from the zeolite lattice framework and substitutes aluminum therein, thus increasing the $SiO_2/Al_2O_3$ molar ratio of the zeolite without introducing large numbers of defect sites in the framework. The final material is truly the first material known to have been prepared wherein the molar ratio of $SiO_2$ to $Al_2O_3$ was changed by a concurrent aluminum extraction and $SiO_2$ insertion. The uniqueness of this product is readily apparent from a consideration of the fact that in over seventeen (17) years since the publication of zeolite Y that only the materials of this patent have been prepared to have $SiO_2/Al_2O_3$ ratios greater than 6 while not containing the significant defect structure which is necessarily associated with any process which extracts aluminum from the framework.

U.S. Pat. No. 4,711,770 describes and claims modified Y zeolites prepared by the process of U.S. Pat. No. 4,503,023.

(There has been one report (G.B. Pat. No. 1,431,944) of the preparation of a faujasite-type structure (Zeolite 529) having a high silica to alumina ratio. The patent alleges that a direct synthesis process prepared a faujasite zeolite having a silica to alumina ratio between 5.5 and 8.0 (see claim 11 of the patent). Unfortunately, the patentees failed to prepare such materials and reported silica to alumina ratios based on measurements employing dehydrated samples. Apparently, the patentees did not appreciate the fact that during the preparation of Zeolite 529 the heating step at 110° C. or greater dehydrated the prepared materials, which resulted in an erroneous interpretation of the $a_o$ measurement. The net result appears to be simple, i.e., Zeolite 529 is simply a form of Zeolite Y.)

Commercial hydrocracking processes for the production of gasoline normally produce, after fractional distillation, two product streams, namely a light gasoline fraction having a boiling range from $C_5$ to 185° F., and a heavy gasoline fraction boiling at higher temperatures. The octane number of the heavy gasoline fraction is not generally important since this fraction is usually sent to a reformer; the heavy gasoline fraction has a high hydrogen content and upon reforming produces a highly aromatic, high octane gasoline, with the added benefit that the reformer operating on the heavy gasoline fraction will generate a significant proportion of the hydrogen required in the hydrocracker.

In contrast, the light gasoline fraction produced during hydrocracking is not suitable for reforming and is therefore added directly to the refinery gasoline pool. Accordingly, it is important that the light gasoline fraction have an octane number sufficiently high to prevent excessive reduction in the octane number of the pool. Moreover, the overall octane requirements for refinery gasoline pools are increasing because of the progressive elimination of lead-based octane boosters from gasoline mandated by environmental regulations and the cost and other problems associated with non-lead-based octane boosters.

Hydrocracking catalysts conventionally comprise two components, a molecular sieve and a hydrogenation component, the latter being a metal which catalyzes hydrogenation. The octane number of the light gasoline fraction produced by hydrocracking varies depending upon whether the metal is a noble or base metal. State-of-the-art base metal hydrocracking catalysts produce light gasoline fractions having octane numbers of only about 80, as measured by either research octane number (RON) or motor octane number (MON). Refiners requiring higher octane numbers are forced to use noble metal hydrocracking catalysts, which can achieve octane numbers (RON and MON) of about 81-82, but which are significantly more expensive than base metal hydrocracking catalysts. In addition, noble metal hydrocracking catalysts are known to be significantly less rugged than similar base metal catalysts, being more sensitive to feedstock impurities (such as sulfur), and temperature variations which occasionally occur in commercial refineries.

With refinery gasoline pools now requiring octane numbers ([RON+MON]/2) of about 85, the low octane number of hydrocracking light gasoline fractions, even those obtained from noble metal hydrocracking catalysts, presents a serious problem, and of course the situation is even worse with hydrocracked light gasoline fractions obtained from base metal hydrocracking catalysts. Consequently, refiners are increasingly being forced to rely upon octane enhancement techniques such as $C_5$–$C_6$ isomerization (which involves substantial capital expenditure and operating costs), or increasingly severe reforming conditions or fluid catalytic cracking (both of which enhance octane number at the expense of gasoline yield). Accordingly, there is a great need for an improved rugged, base metal hydrocracking catalyst which will achieve enhanced octane number in the light gasoline fraction without reduction in gasoline yield.

Also, the activity of state of the art cracking catalysts could usefully be improved. When a commercial hydrocracker is first loaded with fresh or regenerated catalyst, the temperature at which it initially operates is largely determined by the activity of the catalyst, considered of course in relation to the throughput which is needed from the plant. During operation, the activity of the catalyst decreases as it becomes deactivated, and consequently it is necessary to raise the operating temperature at intervals in order to maintain the same amount and quality of throughput. Eventually, the operating temperature reaches the highest value which the reactor can tolerate, at which point it becomes necessary to shut down the reactor and regenerate the catalyst. Accordingly, provided that the rate of deactivation of the catalyst (as measured by the daily increase in temperature needed to maintain constant throughput) is the same, the higher the initial activity of a catalyst, the longer the intervals between shutdowns of the reactor. Accordingly, there is a need for hydrocracking catalysts having higher activity than the present commercial catalysts.

The present invention provides a hydrocracking catalyst derived from a Y-type zeolite, a process for the preparation of this catalyst, a catalyst precursor which is formed during this process, and a hydrocracking process using the hydrocracking catalyst of the invention. Preferred hydrocracking catalysts of the present invention can achieve cracking activities greater than prior art base metal hydrocracking catalysts and in some cases can equal the activity of prior art noble metal hydrocracking catalysts. In addition, the preferred hydrocracking catalyst of the present invention can achieve octane numbers in the light gasoline fraction of the hydrocracked product higher than those achieved with prior art base metal hydrocracking catalysts. This improved activity and improved octane number can be achieved without sacrificing the gasoline yield achieved by prior art base metal hydrocracking catalysts.

SUMMARY OF THE INVENTION

The present invention relates to hydrocracking catalysts, to their preparation and to hydrocracking processes employing such catalysts. The hydrocracking catalyst comprises a zeolitic aluminosilicate which has an $SiO_2/Al_2O_3$ molar ratio of at least 6 and has been treated at an effective temperature, preferably in the presence of steam, and for an effective duration of time in the presence of steam to provide the improved hydrocracking catalyst(s). In a preferred embodiment of the invention, the hydrocracking catalyst has been treated by (i) thermal treatment at an effective temperature and for an effective time in the presence of steam, followed by (ii) ion-exchange with a solution containing ammonium ion; and (2) addition of an effective amount of a hydrogenation component.

In a preferred variant of the process of the present invention, hereinafter referred to as the "high activity, high octane" variant, the starting crystalline zeolitic aluminosilicate is a Y-type zeolite having an $SiO_2/Al_2O_3$ molar ratio of at least about 9 and a unit cell dimension ($a_o$) of less than about 24.55 Å, and the steam treatment is carried out for a period sufficient to cause a decrease of not more than about 0.1 Å in the unit cell dimension, thereby producing a Y-type zeolite product having a $SiO_2/Al_2O_3$ molar ratio of at least about 9 and a unit cell dimension of less than about 24.45 Å.

DETAILED DESCRIPTION OF THE INVENTION

Figure 1:
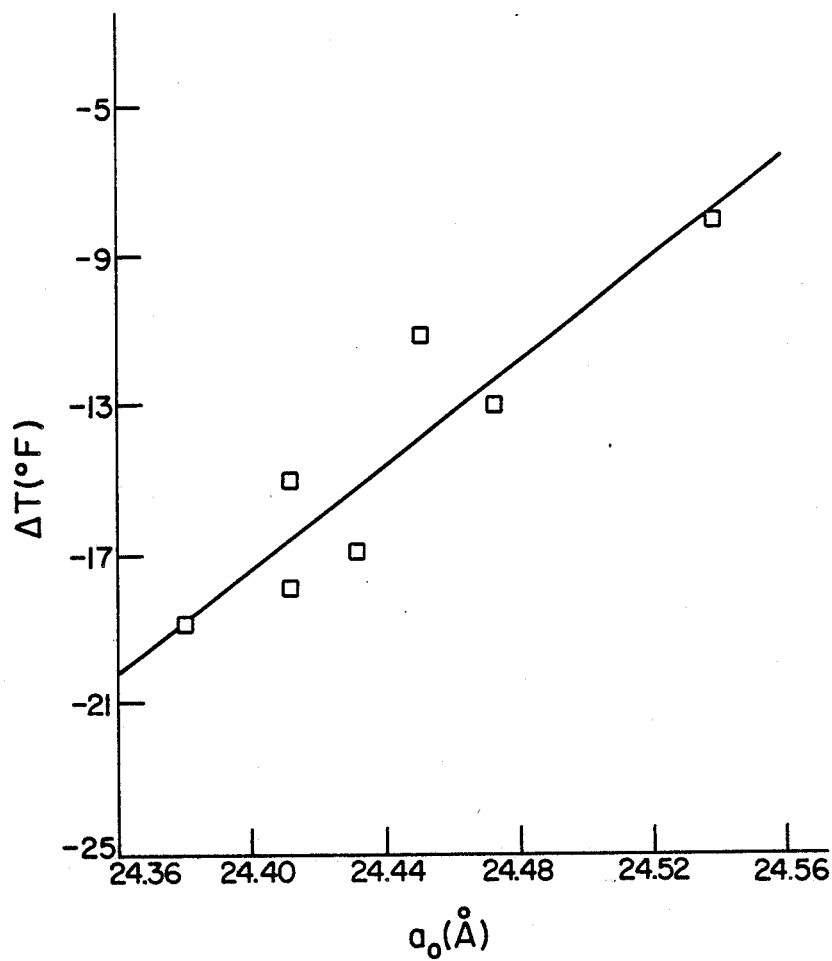
FIG. 1 is a graph showing the variation in hydrocracking activity of catalysts of the present invention, with unit cell dimension of the steamed Y-type zeolite, as described in certain Examples below.

The present invention relates to the hydrocarbon conversion process generally known as hydrocracking. Hydrocracking is a process for converting high boiling hydrocarbon feedstocks to lower boiling products by cracking the high boiling hydrocarbon feedstock in the presence of high pressure excess hydrogen and hydrogenating the unsaturates in the product.

Such processes are well known in the art (see: *Zeolite Chemistry and Catalysis*, by Jule A. Rabo, ACS Monograph 171, Chapter 13 (1976)) and are known to be of several general types. Two well known types include the single-stage type and the two-stage type. In the single-stage type (Unicracking-J.H.C. or Jersey Hydrocracking) process the feedstocks are pretreated to convert essentially all the organic sulfur and nitrogen to hydrogen sulfide and ammonia respectively, e.g., by a hydrotreater, whereby desulfurization and denitrification are effected. The hydrocarbon stream containing hydrogen sulfide and ammonia is then hydrocracked in a reactor in the presence of a catalyst at a single pass conversion of between 40 and 70 percent. Any unconverted hydrocarbon may be recycled to extinction following fractionation for separation of converted products. The two-stage process (Unicracking-JHC) has been developed which provides a second stage that employs the effluent from the single-stage type hydrocracking process (with passage of the recycle gas stream through an ammonia scrubber) and from a second hydrocracking reactor as the input feed for a fractionation unit. The unconverted feedstock is then recycled to extinction in the second hydrocracking reactor.

Because the catalyst in the second hydrocracking reactor operates in an essentially ammonia-free environment, the poisoning of the catalyst is greatly reduced and the rate of conversion in this reactor can be maintained at a higher level, e.g. 60 to 80 percent and typically is carried out at a lower temperature than the first-stage reactor.

The catalysts of the present invention will be referred to herein, solely for the purpose of reference herein, as LZ-210-T to denominate an LX-210 zeolite which has been subjected to a hydrothermal treatment (as hereinafter defined). Other components and treatments may be employed to provide the final catalytic cracking catalysts and exemplary of such will be discussed hereinafter.

The present invention relates to hydrocracking processes and to new hydrocracking catalysts and their use where the hydrocracking catalyst is formed with a zeolitic aluminosilicate (which may be referred to hereinafter as LZ-210) which has an $SiO/Al_2O_3$ molar ratio of at least 6 and has been treated at an effective temperature, preferably in the presence of steam, and for an effective duration of time in the presence of steam to provide a hydrocracking catalyst.

It has been found that by treating the zeolitic aluminosilicates above described for an effective time and at an effective temperature that superior hydrocracking catalysts are obtained. Surprisingly, it has been found that when the $SiO_2$ to $Al_2O_3$ ratio of LZ-210-T is equal to or greater than 9.0, it is highly desirable to control the conditions of the hydrothermal treatment so as to limit the shrinkage in unit cell size which occurs during the hydrothermal treatment so as to produce a high activity, high octane catalyst of the present invention. Accordingly, when the starting crystalline zeolitic aluminosilicate used to prepare the hydrocracking catalysts of the present invention has a $SiO_2/Al_2O_3$ molar ratio of at least about 9, this aluminosilicate is desirably a Y-type zeolite having a unit cell dimension ($a_o$) of less than about 24.55 Å, and the hydrothermal treatment is desirably carried out for a period sufficient to cause a decrease lo of not more than about 0.1 Å in the unit cell dimension, thereby producing a Y-type zeolite product having a $SiO_2/Al_2O_3$ molar ratio of at least about 9 and a unit cell dimension of less than about 24.45 Å; it is this product which serves as the precursor for the high activity, high octane catalyst of the present invention. In this preferred process, preferably the Y-type zeolite product has a unit cell dimension of less than about 24.435 Å, most desirably not more than about 24.41 Å. Also, preferably the decrease in the unit cell dimension during the hydrothermal treatment is not greater than about 0.08 Å, and desirably the Y-type zeolite starting material has an $SiO_2/Al_2O_3$ molar ratio (R) which is in the range of from about 9 to about 12 and such that:

$$a_p \geq 24.5614 - 0.0167R$$

where $a_p$ is the unit cell dimension of the steamed product.

The aluminosilicates referred to herein as LZ-210, from which LZ-210-T is derived, are generally disclosed in the aforementioned U.S. Pat. No. 4,503,023, incorporated herein by reference thereto, as zeolites prepared by a novel fluorosilicate treatment process.

LZ-210-T is derived from aluminosilicates having in the dehydrated state, a chemical composition expressed in terms of mole ratios of oxides as $$(0.85 - 1.1) M_{2/n}O : Al_2O_3 : x\ SiO_2$$

wherein "M" is a cation having the valence "n" and "x" is a value greater than 6, having an X-ray powder diffraction pattern having at least the d-spacings set forth in Table A below, and having extraneous silicon atoms in its crystal lattice in the form of $SiO_4$ tetrahedra, preferably in an average amount of at least 1.0 per 10,000 $Å^3$. The silica/alumina ratio of the LX-210 starting material may vary widely; for example, starting materials having silica/alumina ratios of 10-20, more specifically 11-15, may be employed.

For purposes of simplifying the description of certain subclasses of LZ-210 the framework composition may be expressed in terms of mole fractions of framework tetrahedra $TO_2$. The starting zeolite may be expressed as:

$$(Al_aSi_b\blacksquare_z)O_2$$

whereas "a" is the mole fraction of aluminum tetrahedra in the framework; "b" is the mole fraction of silicon tetrahedra in the framework; ■ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fractions of framework tetrahedra ($TO_2$) will have the form $$[Al_{(a-N)}Si_{b+(N-\Delta z)}\blacksquare_z]O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluorosilicate treatment; "$\Delta z$" is the net change in the mole fraction of defect sites in the zeolite framework resulting from the treatment $$\Delta z = z\ (\text{product zeolite}) - z\ (\text{starting zeolite})$$

The term "Defect Structure Factor" for any given zeolite is equivalent to the "z" value of the zeolite. The net change in Defect Structure Factors between the starting zeolite and the product zeolite is equivalent to "$\Delta z$". Numerically, the sum of the values:

$$(a-N)+[b+(N-\Delta z)]+z=L$$

A subclass of the above LZ-210 compositions, i.e. those which are characterized by having both high molar $SiO_2/Al_2O_3$ ratios and low Defect Structure Factors (as hereinafter discussed), can be defined as having a chemical composition expressed in terms of mole fractions of framework tetrahedra as:

$$[Al_{(a-N)}Si_{b+(N-z)}\blacksquare_a]O_2$$

wherein : the mole fraction of aluminum (-N) removed from the framework of the starting zeolite is at least 0.03a; [b+(N- Δ z)/(a-N)] has a value greater than 3.0; the change in defect structure factor Δ z is less than 0.08 and preferably less than 0.05; the increased silicon content in the framework, (N- Δ z)/N is at least 0.5; and the cation equivalent expressed as a monovalent cation species, M+/A1, is from 0.85 to 1.1 and the material has the characteristic crystal structure of zeolite Y as indicated by an X-ray powder diffraction pattern having at least the d-spacings set forth broadly in Table A.

TABLE A

| d (Å) | Intensity |
|---|---|
| 14.3–14.10 | very strong |
| 8.71–8.66 | medium |
| 7.43–7.38 | medium |
| 5.66–5.61 | strong |
| 4.75–4.71 | medium |
| 4.36–4.33 | medium |
| 3.76–3.73 | strong |
| 3.30–3.27 | strong |
| 2.85–2.82 | strong |

Zeolite LZ-210, as defined above will have a cubic unit cell dimension, ao, of less than 24.65 Angstroms and an adsorption capacity for water vapor at 25° C. and 4.6 Torr water vapor pressure of at least 20 weight percent based on the anhydrous weight of the olite, and preferably an oxygen adsorption capacity at Torr and −183° C. of at least 25 weight percent. LZ-210 can be prepared by a method which removes framework aluminum from a zeolite having $SiO_2/Al_2O_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in the aforementioned U.S. Pat. No. 4,503,023 comprises contacting a crystalline zeolite having a pore diameter of at least about 3 Angstroms and having a molar $SiO_2/Al_2O_3$ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than the $SiO_2/Al_2O_3$ of the final LZ-210 product employed herein by using the above process to increase the $SiO_2/Al_2O_3$ ratio to greater than 6.0. A preferred procedure comprises:

(a) providing a zeolite Y composition having a molar $SiO_2/Al_2O_3$ ratio lss than that of the final LZ-210 product;

(b) contacting and reacting, at a temperature of from 20° C. to 95 ° C., said zeolite Y with a fluorosilicate, preferably ammonium fluorosilicate. The fluorosilicate solution in the form of an aqueous solution in the range of about 5 to 7 is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly, it is preferred that the $SiO_2/Al_2O_3$ ratio in the initial Y zeolite starting material be at least about 3.0. Also it is preferred that at least about 50%, and more preferably at least 95%, of the $AlO_4^-$ tetrahedra of the naturally occurring or as-synthesized zeolite are present in the starting zeolite, i.e., the starting zeolite advantageously contains as many as possible of its original $AlO_4^{31}$ tetrahedra or has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations formed the most soluble salt in this regard and it is accordingly preferred that at least 50 percent, most preferably 85 or more percent, of the zeolite cations be ammonium cations. Sodium and potassium, two of the most common original cations in zeolites are found to rorm $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula

2/bSiF6 wherein A is preferably a metallic or non-metallic cation other than H+ having the valence "b". Cations represented by "A" are alkylammonium, $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

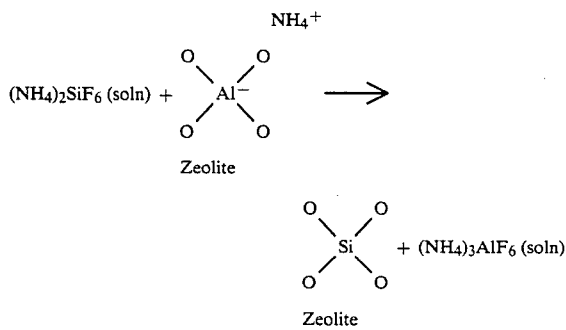

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also, increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid under destructive acidic attack on the zeolite structure apart from the intended reaction with the fluorosilicate. Very slow rates of addition of fluorosilicate salts ensure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125 ° C. and as low as 20° C. have been suitably employed in some instances. At pH values below about 3, crystal degradation is generally found to be unduly severe, whereas at pH values higher than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent—the undissolved solids being readily available to replace dissolved molecular species consumed in reaction with the zeolite. As stated hereinabove, the amount of dissolved fluorosilicates employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the "anhydrous state" of the zeolite will be intended unless otherwise stated. The term "anhydrous state" is employed herein to refer to a material considered to be obtained by heating the zeolite in dry air at 100° C. for 1 to 2 hours.

It is apparent from the foregoing that, with respect to reaction conditions, it is desirable that the integrity of the zeolite crystal structure be substantially maintained throughout the process, and that in addition to having extraneous (non-zeolitic) silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y, these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T). J. Am. Chem. Soc., 60, 309 (1938) using nitrogen as the adsorbate. In determining the adsorption capacity, the capacity for oxygen at −183 ° C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e. non-zeolitic, source, preferably in conjunction with a crystal structure which is characterized as containing a low level of tetrahedral defect sites. This defect structure, if present, is revealed by the infrared spectrum of zeolites in the hydroxyl-stretching region. In untreated, i.e. naturally occurring or as-synthesized zeolites the original tetrahedral structure is conventionally represented as

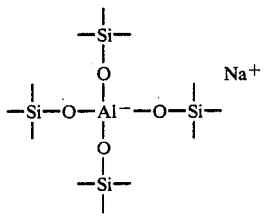

After treatment with a complexing agent such as ethylenediaminetetraacetic acid (H₄EDTA) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

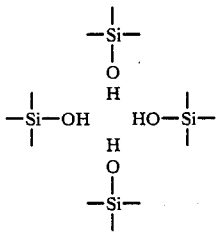

The infrared spectrum of the aluminum depleted zeolite will show a broad nondescript adsorption band beginning at about 3750 cm⁻¹ and extending to about 3000 cm⁻¹. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interfering hydroxyl groups and thus be able to observe the absorption attributable to the "nest" hydroxyls only. The hydroxyls belonging to adsorbed water are avoided by subjecting the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm⁻¹, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm⁻¹ to about 3000 cm⁻¹ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm⁻¹ to 3000 cm⁻¹ range For instance, a rather sharp band at 3745 cm⁻¹ has been attributed to the Si-OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm⁻. Thus the relative number of defect sites remaining in a zeolite product of this invention can be gauged by first removing any adsorbed water from the zeolite, determining the value of the absolute absorbance in its infrared spectrum at a frequency of 3710 cm⁻¹, and comparing that value with the corresponding value obtained from the spectrum of a zeolite having a known quantity of defect structure. The following specific procedure has been arbitrarily selected and used to measure the amount of defect structure in the products prepared in certain Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counter-parts and also with equally siliceous prior known counter-parts prepared by other techniques.

DEFECT STRUCTURE FACTOR FOR LZ-210

(A) Defect Structure Zeolite Standard.

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard.

Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than $1 \times 10^{-4}$ mm. Hg to remove all observable traces of physically adsorbed water from the zeolite. This condition of the zeolite is evidenced by the total absence of an infrared adsorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrepancies in the analysis due to different apparatus. The spectrum, normally obtained in the transmission mode of operation, is mathematically converted to and plotted as wave number vs. absorbance.

(C) Determination of the Defect Structure Factor.

The defect structure factor (z) is calculated by substituting the appropriate data into the fol owing formula:

$$z = \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 cm$^{-1}$, $AA_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for $SiO_2$, $Al_2O_3$ and the cation content as $M_{2/n}O$ whether silicon has been substituted for aluminum in the zeolite as a result of the treatment and also the efficiency of any such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased $SiO_2/Al_2O_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2Θ, where Θ is the Bragg angle as observed on the strip chart. Intensities are determined from the heights of diffraction peaks after subtracting background.

In determining the cation equivalency, i.e. the molar ratio $M_{2/n}O/AL_2O_3$ in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each $AlO_4^-$ tetrahedron or whether some of the positive valence of the cation is used in bonding with $OH^-$ or $H_3O^+$ ions.

The preferred novel crystalline aluminosilicate compositions of the present invention will contain a chemical or molar framework composition which can be determined from the expression of mole fractions of framework tetrahedra previously described:

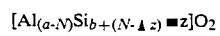

$$[Al_{(a-N)}Si_{b+(N-\Delta z)} \blacksquare z]O_2$$

wherein: the framework Si/Al ratio is determined by $[b+(N- z)]/(a-N)$ and is numerically greater than 3. The mole fraction of silicon tetrahedra substituted into the framework of the product zeolite (N-▲ z) is increased by at lwast a value of (N-▲ z)/N, which is numerically greater than or equal to 0.5, the change in Defect Structure Factor ▲ z being increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

CATALYST LZ-210-T

The catalyst referred to herein as LZ-210-T was prepared from LZ-210 materials having a silica to alumina ratio of greater than 6. The preparation of LZ-210-T involve steps, respectively, of: (1) hydrothermal treatment; followed by (2) cation exchange with a solution containing ammonium ion. Other treatments may also be employed therewith. Both the hydrothermal treatment and the ammonium cation exchange may be carried out for more than one time while the sequence of steps remains unchanged. For example, the ammonium cation exchange may be effected by carrying out the ammonium exchange in one, two or more ion-exchanges with an ammonium salt.

The terms "thermal treatment" and "hydrothermal treatment" are employed here to denominate a thermal calcination in the presence of steam carried out at an effective temperature and time in the presence of an effective amount of steam to provide an LZ-210 based catalyst having improved catalyst life and improved selectivity to desired products as compared to the non-thermally treated LZ-210. These improved catalysts are referred to herein as LZ-210-T. The hydrothermal treatment is typically carried out at effective process conditions comprising a temperature in excess of 300° C. for a period in excess of 0.25 hours, preferably at least 0.5 hours, in the presence of at least about 20 percent by volume steam in air. The term "air" is meant to cover equivalents such as nitrogen, argon, neon and the like as well as the gaseous mixture commonly referred to as air. The source of the steam is not important and may be provided from an external source or may be generated in situ at the temperatures employed for the hydrothermal treatment.

In many cases, it is advantageous to conduct the hydrothermal treatment at a temperature of 400 ° C. or higher, or even 500° C. or higher. However, in the preferred high activity, high octane embodiment of the present invention wherein a Y-type zeolite having an $SiO_2/Al_2O_3$ molar ratio of at least about 9 and a unit cell dimension ($a_o$) of less than about 24.55 Å is treated with steam for a period sufficient to cause a decrease of not more than about 0.1 Å in the unit cell dimension, thereby producing a Y-type zeolite product having a $SiO_2/Al_2O_3$ molar ratio of at least about 9 and a unit cell dimension of less than about 24.45 Å, excessive steaming temperatures should be avoided since severe steaming conditions tend to cause too great a decrease in the unit cell dimension ($\Delta a_o$) of the Y-type zeolite starting material, with a resultant decline in the activity of the catalyst and the octane number of the products produced thereby. Accordingly, in this case, it is generally desirable that the steam treatment be conducted at a temperature not greater than about 600° C., and preferably not greater than about 500° C. Furthermore, in this case, it is important that the steam treatment not excessively degrade the crystallinity of the zeolite, since such degradation of crystallinity adversely affects the performance of hydrocracking catalysts prepared from the steamed zeolite. The effect of the steam treatment on the crystallinity of the zeolite may be assessed by measuring the surface area per unit weight of the zeolite after the removal of framework aluminum therefrom, as discussed in detail below, or by determination of the crystallinity by X-ray measurements.

As already mentioned, in this preferred high activity, high octane embodiment of the invention, the steam treatment is effected such that the decrease in the unit cell dimension ($\Delta a_o$) of the Y-type zeolite starting material is not greater than about 0.1 Å. It has been found empirically that, at least in this preferred embodiment of the invention, there is a strong correlation between $\Delta a_o$ and the octane number of the light gasoline fraction of the resulting hydrocracked product; this correlation is discussed in more detail in Example 38 to 45 below with reference to FIG. 2. Since the octane number increases as $\Delta a_o$ decreases, it is desirable to keep $\Delta a_o$ as small as possible, and preferably less than 0.08 Å. Empirically, $\Delta a_o$ of less than 0.08 Å has been found to produce catalysts capable of achieving an improvement in light gasoline fraction RON of approximately 1 to 2 units when operating at 60% conversion with a standard feedstock, as compared with state-of-the-art base metal hydrocracking catalysts.

The requirement for $\Delta a_o$ to be kept small must, however, be balanced against the fact that the hydrocracking activity of these preferred catalysts correlates strongly with the unit cell dimension ($a_o$) of the steamed zeolite; at least within the ranges of ao and preferred silica/alumina ratio of 9–12 used in the high activity, high octane variant of the present invention, the hydrocracking activity increases with decreasing unit cell dimension. Accordingly, it is preferred that the steam treatment be carried out such that the unit cell dimension of the steamed zeolite is less than about 24.435 Å, desirably less than about 24.42 Å, and most desirably less than about 24.41 Å.

It is known to those skilled in the art of synthesizing high-silica zeolites that the unit cell dimension of a Y-type zeolite (in Å) and its framework alumina content are correlated by the Breck equation:

$$a_o = 0.00868 \, N_F + 24.191$$

where $N_F$ represents the number of framework aluminum atoms per unit cell (see D. W. Breck, Zeolite Molecular Sieves, Wiley, New York, (1974), page 94). Since the unit cell dimension of the zeolite starting material used in the process of the present invention is thus related to its silica/alumina ratio, it is possible to define a preferred group of processes of the present invention in terms of the silica/alumina ratio of the zeolite starting material and the unit cell dimension of the steamed product. This preferred group of processes are shown graphically by the shaded area in FIG. 5, and are the processes in which the unit cell dimension of the steamed product ($a_p$) is less than about 24.41 Å and the Y-type starting material has an $SiO_2/Al_2O_3$ molar ratio (R) such that:

$$a_p \geq 24.5614 - 0.0167R.$$

Desirably, the silica/alumina ratio of the zeolite starting material is in the range of about 9 to about 12.

It is well-known to those skilled in the zeolite art that hydrothermal treatment causes aluminum in the lattice framework of a zeolite to migrate to non-framework positions. The amount of non-framework aluminum in the zeolite following hydrothermal treatment depends upon the silica/alumina ratio of the zeolite starting material and the $\Delta a_o$ caused by the hydrothermal treatment, and may also be affected by chemical treatments (for example, certain ion-exchange processes) following hydrothermal treatment. In the high activity, high octane variant of the present invention, it is desirable that the product contain, on average, not more than about 10 atoms of non-framework aluminum per unit cell. Measurement of non-framework aluminum may be effected by a combination of chemical analysis for aluminum (which measures total aluminum per unit cell) and X-ray powder diffraction analysis (which gives, via the Breck equation given above, the number of framework aluminum atoms per unit cell); the non-framework aluminum can then be obtained by difference.

The ammonium cation exchange is generally carried out by slurrying zeolite LZ-210 with between 5 to 15 volumes of water per volume of catalyst after which an ammonium salt is added to the slurry, typically in an amount of from about 0.5 to 2 parts by weight per part by weight of the steamed zeolite. Although the resulting mixture may then be maintained at room temperature, the resulting mixture is typically heated to a temperature above about 50° C., and if desired up to 100° C. for a period between about 0.5 to 3 hours. The mixture is filtered and water washed until excess anion from the ammonium salt has been removed. The ammonium-exchange process is typically repeated one or more times as above described.

This ammonium cation exchange serves to reduce the soda content of the steamed zeolite and to increase the potential acidity of the zeolite by replacing sodium cations with ammonium cations which, at the temperatures used in the hydrocracking process, split to produce ammonia and protons attached to zeolite framework oxide ions.

HYDROCRACKING CATALYST

After the above process steps have been completed, i.e. the LZ-210-T product (which may be referred to herein as a "catalyst precursor") has been prepared, the product is treated to provide a hydrogenation component therewith. It is well known in the art that the hydrocracking catalyst and hydrogenation component are generally employed with a binder material or, as commonly referred to, with an inorganic oxide matrix which can be inert or also catalytically active. The addition of the hydrogenation component to the catalyst precursor may be effected before or after the catalyst precursor is combined with the binder (if any). However, for ease of handling, the normal industrial practice is to first combine the catalyst precursor with the binder, and thereafter to introduce the hydrogenation component. Accordingly, the following description is written with reference to the normal sequence of first combining the catalyst precursor with the binder and then introducing the hydrogenation component, but it should be borne in mind that these two steps may, if desired, be performed in the reverse order.

Thus, in carrying out the hydrocracking process of the present invention, the zeolites may be admixed (blended) or provided sequentially to other materials which may provide some property which is beneficial under process conditions, such as improved temperature resistance or improved catalyst life by minimization of coking, or which are simply inert under the process conditions used. Such materials may include synthetic or naturally-occurring substances as well as inorganic materials such as clays, silicas, aluminas, metal oxides and mixtures thereof. In addition, the zeolites may be formed with materials such as silica, alumina, silica-alumina, silica-magnesia, silica-zirconia, silica-thoria, silica-berylia, and silica-titania, as well as ternary compositions, such as silica-alumina-thoria, silica-alumina-zirconia and clays present as binders. The relative proportions of the above materials and the zeolites may vary widely with the zeolite content ranging between about 1 and about 99 percent, preferably about 5 and about 95 percent, by weight of the composite. The exact amount of any matrix material employed with LZ-210-T will depend on many process factors and, accordingly, can vary. The matrix may be peptized or added as is to the LZ-210-T, and then agglomerated to the desired finished form. The finished catalyst particles are then typically dried in air, purged and calcined.

As described below, the hydrogenation component may be added by almost any method, such as ion exchange or impregnation and is preferably ion-exchange when noble metals are employed and preferably impregnation when base metals are employed as the hydrogenation component. When the hydrogenation component is provided by ion-exchange the LZ-210-T product is slurried in water. The noble metal complex solution is added in a conventional manner to effect ion exchange of the LZ-210-T.

The hydrocracking catalysts employing LZ-210 will typically be employed in conjunction with a hydrogenation component of the type which are commonly employed in hydrocracking catalysts. The hydrogenation component is generally selected from the group of hydrogenation catalysts consisting of one or more metals of Group VIB and Group VIII, including the salts, complexes and solutions containing such. The preferred hydrogenation catalyst is selected from the groups of Group VIII metals, these salts and complexes thereof and is most preferably selected as a salt or complex of at least one noble metal of platinum, palladium, rhodium, iridium and mixtures thereof, and/or at least one base metal of nickel, molybdenum, cobalt, tungsten, titanium, chromium and mixtures thereof. As recognized in the art, the noble and base metals will not generally be employed in the same catalyst system; in particular, in the preferred high activity, high octane variant of the present invention, the hydrogenation component desirably comprises one or more base metals. The hydrogenation component is present in an effective amount to provide the hydrogenation function of the hydrocracking catalyst and for noble metals is generally present in an amount between about 0.05% and about 1.5% by weight based on the total weight of the hydrocracking catalyst including the weight of any binder or matrix material which may be present, as hereinafter discussed, although effective amounts outside this range may be employed. Although effective amounts in excess of 1.5 percent by weight may be employed, the preferred effective amount of hydrogenation component is between about 0.3% and about 1.2% by weight. When the hydrogenation catalyst is a base metal(s) the effective amount will generally be between about 5% and about 30% percent by weight or more of the base metal oxide(s) based on the total weight of the hydrocracking catalyst.

The final form of the hydrogenation component is not narrowly limited herein but may be a metal oxide or a metal sulfide. Since sulfur is typically present in the hydrocarbon feedstock being treated, the actual form of some of the hydrogenation component(s) may well be a sulfide due to in situ reactions.

The hydrogenation components can be incorporated into the overall catalyst composition by any one of numerous procedures. They can be added either to LZ-210-T or to the binder or to a combination thereof. In the alternative, multiple hydrogenation components (two or more) are added to the zeolite. They may be added by co-mulling, impregnation, or ion exchange whereby one or more may be added to LZ-210-T by impregnation, co-mulling or co-precipitation while the other is similarly added or added by a different procedure. For example, metal compounds such as the sulfides, oxides or water-soluble salts can be added by co-mulling, impregnation or precipitation to either LZ-210-T, the refractory oxide or the combination thereof before the composite is finally calcined. In the alternative these components can be added to the finished particle by impregnation with an aqueous, alcoholic or hydrocarbon solution of soluble compounds or precursors. Impregnation is the preferred technique when the hydrogenation component is a base metal while ion-exchange techniques are preferred when noble metals are employed as the hydrogenation component.

Although the hydrogenation components can be combined with LZ-210-T as the sulfides, that is generally not the case. They are usually applied as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

The high activity, high octane catalysts of the present invention desirably comprise at least one metal selected from the group consisting of nickel and cobalt, and at least one metal selected from the group consisting of tungsten and molybdenum, the preferred combination of metals being nickel and tungsten. Although the metals may simply be physically admixed with the zeolite, it is preferred that they be incorporated into the zeolite itself. Such incorporation may be effected by adding a solution of compounds of the desired metals to the zeolite (either in the form in which it normally emerges from the aluminum-removal process or in the form of larger pieces prepared from the pulverulent form by extrusion, prilling or similar techniques used to combine the zeolite with the binder). In a preferred technique, the pore volume of the zeolite and binder extrudates is determined and the volume of the solution of the metals added to the zeolite and binder extrudates is adjusted to substantially equal this pore volume; this technique enables the amount of metal added to the zeolite and binder extrudates to be controlled accurately, and avoids waste of expensive metal compounds, particularly those of tungsten. Following the addition of the metal, the catalyst is normally dried and then calcined to convert the metals to their oxides; such calcination also activates the catalyst.

The amount of metals added to the zeolite should be limited since excessive quantities of metal have been found to promote undesirable hydrocracking reactions. Desirably, the quantities of metal added are from about 2 to about 8 weight percent of nickel (as NiO) and from about 15 to about 25 weight percent of tungsten (as $WO_3$), based upon the weight of the zeolite.

Since the hydrocracking catalysts of the present invention are produced from LZ-210 zeolites by hydrothermal treatment and ammonium cation exchange, and are not subjected to ion exchange with rare earth metals, their ion exchange sites are essentially free of rare earth cations, and thus the hydrocracking catalysts consist essentially of the hydrogenation component on the zeolitic support. The cations present in their ion exchange sites are usually essentially $H^+$ and its precursors (for example $NH_4^+$) and the cations of the hydrogenation component; thus, for example, if the hydrogenation component comprises one or more Group VIB metals and/or one or more non-noble Group VIII metals, the hydrocracking catalyst is essentially free of noble metals.

Thus, the preferred process for the preparation of a hydrocracking catalyst based on LZ-210-T comprises treating a zeolitic aluminosilicate which has a mole ratio of oxides in the dehydrated state $$(0.85-1.1) M_{2/n} O:Al_2O_3; x\ SiO_2$$

wherein M is a cation having a valence of "n"; "x" has a value greater than 6.0, has an X-ray powder diffraction pattern having at least the d-spacings of Table A and has extraneous silicon atoms in the crystal lattice in the form of framework $SiO_4$ tetrahedra by the steps of:
 (i) thermally treating the aluminosilicate at an effective temperature for an effective time;
 (ii) treating the aluminosilicate with a solution of an ammonium salt; and
 (iii) providing an effective amount at least one metal selected from the class consisting of Pt, Pd, Rh, Ru, Ni, W, Mo, Co, Ti, Cr to the product of steps (i) and (ii) to provide a hydrocracking catalyst;
with the proviso that each of steps (i), (ii) and (iii) may be carried out in any order for one or more times. For example, the treatment steps may be combined to provide overall processes including the steps: (i), (ii) and then (iii); i and (iii); (ii), (i) and then (iii); (i), (ii), (i) and then (iii); (ii), (i), ii and then (iii); etc.

The hydrocracking catalyst LZ-210-T may be used in conjunction with molecular sieves such as silicalite (U.S. Pat. No. 4,061,724) or with other aluminosilicates including: natural zeolits such as erionite, mordenite, offretite, chabazite, faujasite, etc; and with synthetic zeolites including: Zeolites X and Y, ZSM-type zeolites (e.g. ZSM-5, ZSM-11, ZSM-12, ZSM-20 and ZSM-21); FU-1-type zeolites, and the like. The hydrocracking catalyst LZ-210-T may be used in conjunction with the non-zeolitic aluminophosphate and silicoaluminophosphate molecular sieves described in U.S. Pat. Nos. 4,310,440; 4,440,871; 4,500,651; 4,554,143; and 4,567,029, and in the following patents and applications [(A) following a serial number indicates that the application is abandoned, while (CIP) following a serial number indicates that the application is a continuation-in-part of the immediately preceding application and (C) indicates that the application is a continuation of the immediately preceding application]:

| U.S. Ser. No. | Filed | NZMS |
| --- | --- | --- |
| 599,808 (A) | April 13, 1984 | AsAPSO |
| 845,484 (CIP) | March 31, 1986 | AsAPSO |
| 600,177 (A) | April 13, 1984 | BAPSO |
| 845,255 (CIP) | March 28, 1986 | BAPSO |
| 600,176 (A) | April 13, 1984 | BeAPSO |
| 841,752 (CIP) | March 20, 1986 | BeAPSO |
| 599,830 (A) | April 13, 1984 | CAPSO |
| 852,174 (CIP) | April 15, 1986 | CAPSO |
| 599,925 (A) | April 13, 1984 | GaAPSO |
| 845,985 (CIP) | March 31, 1986 | GaAPSO |
| 599,971 (A) | April 13, 1984 | GeAPSO |
| 852,175 (CIP) | April 15, 1986 | GeAPSO |
| 599,952 (A) | April 13, 1984 | LiAPSO |
| 847,227 (CIP) | April 2, 1986 | LiAPSO |
| 600,179 | April 13, 1984 | TiAPSO |
| (now U.S. Pat. No. 4,684,617 issued August 4, 1987) | | |
| 49,274 (C) | May 13, 1987 | TiAPSO |
| 600,180 | April 13, 1984 | MgAPSO |
| 600,175 | April 13, 1984 | MnAPSO |
| (now U.S. Pat. No. 4,686,092 issued August 11, 1987) | | |
| 600,174 | April 13, 1984 | CoAPSO |
| 600,170 | April 13, 1984 | ZnAPSO |
| 600,173 | April 13, 1984 | FeAPSO |
| (now U.S. Pat. No. 4,683,217 issued July 28, 1987) | | |
| 600,168 (A) | April 13, 1984 | QuinAPSO |
| 63,791 (C) | June 22, 1987 | QuinAPSO |

-continued

| U.S. Ser. No. | Filed | NZMS |
|---|---|---|
| 600,181 | April 13, 1984 | QuinAPSO |
| 600,182 | April 13, 1984 | CoMnMgAPSO |
| 57,648 (C) | June 9, 1987 | CoMnMgAPSO |
| 600,183 | April 13, 1984 | SenAPSO |
| 600,166 (A) | April 13, 1984 | AsAPO |
| 830,889 (CIP) | Feb. 19, 1986 | AsAPO |
| 599,812 (A) | April 13, 1984 | BAPO |
| 804,248 (C) (A) | Dec. 4, 1985 | BAPO |
| 29,540 (CIP) | March 24, 1987 | BAPO |
| 599,776 (A) | April 13, 1984 | BeAPO |
| 835,293 (CIP) | March 3, 1986 | BeAPO |
| 599,813 (A) | April 13, 1984 | CAPO |
| 830,756 (CIP) | Feb. 19, 1986 | CAPO |
| 599,771 (A) | April 13, 1984 | GaAPO |
| 830,890 (CIP) | Feb. 19, 1986 | GaAPO |
| 599,807 (A) | April 13, 1984 | GeAPO |
| 841,753 (CIP) | March 20, 1986 | GeAPO |
| 599,811 (A) | April 13, 1984 | LiAPO |
| 834,921 (CIP) | Feb. 28, 1986 | LiAPO |
| 600,171 | April 13, 1984 | FCAPO |
| (now U.S. Pat. No. 4,686,093 issued August 11, 1987) | | |
| 600,172 (A) | April 13, 1984 | ElAPO (M comprises two different elements) |
| 846,088 (CIP) | March 31, 1986 | |
| 599,824 (A) | April 13, 1984 | FeTiAPO |
| 902,129 (C) | September 2, 1986 | FeTiAPO |
| 599,810 (A) | April 13, 1984 | XAPO |
| 902,020 (C) | September 2, 1986 | XAPO |

The conditions used in the hydrocracking process of the present invention are substantially similar to those used in prior art hydrocracking processes, which are well-known to those skilled in the petroleum refining art. The hydrocarbon feedstock to be charged to the hydrocracking unit typically boils above about 300° F. (149° C.), preferably between about 350° and 1200° F. (between about 177° and about 649° C.) and more preferably between about 420° and about 900° F. (between about 216° and about 482° C.). The hydrocarbon feedstock may be derived from many sources including catalytic cracking processes, coking processes, fractionators from crude oil, hydroprocessing, pyrolysis processes and others. When operating a hydrocracking process to maximize gasoline production, the typical feedstock currently in commercial use has an end boiling point not greater than about 800° F. (427° C.). Typically, a light catalytic cycle oil, or a light virgin gas oil, or mixtures thereof, boiling in the range of from about 300° to 800° F. (149° to 427° C.) is employed as the feedstock. The feedstock may be pre-treated in a hydrotreater to reduce the content of organic compounds which contain sulfur and/or nitrogen. The feedstock may have a significant sulfur content, present as hydrogen sulfide, ranging from 0.1 to 3 weight percent, and nitrogen content, present as ammonia, in an amount up to 4000 parts per million, or even more. Temperature, space velocity, and other process variables may be adjusted to compensate for the effects of nitrogen on the hydrocracking catalyst activity.

The feedstock is contacted in the hydrocracking reaction zone with the hydrocracking catalyst in the presence of hydrogen-containing gas. Hydrogen is consumed in the hydrocracking process and an excess of hydrogen is typically maintained in the reaction zone. Advantageously, a hydrogen-to-oil (feedstock) ratio of at least 1,000 standard cubic feet per barrel of feed (SCFB) (28.3 standard $m^3$ per barrel) is employed, and the hydrogen-to-oil ratio may range up to 20,000 SCFB (566 $m^3$ per barrel). Preferably, about 4,000 to 12,000 SCFB (113 to 340 $m^3$ per barrel) is employed.

The hydrocracking reaction zone is typically operated under conditions of elevated temperature and pressure. The total hydrocracking pressure usually is between about 400 and about 4,000 pounds per square inch gauge (psig.) (between about 2.76 and about 27.6 MPa.), and preferably between about 500 and 2000 psig. (between about 3.45 and 13.8 MPa.). The hydrocracking reaction is exothermic and a temperature rise occurs across the catalyst bed. Therefore, the inlet temperature to the hydrocracking reaction zone may be 10° to 40° F. (5.6 to 22.2° C.) lower than the exit temperature. The average hydrocracking catalyst bed temperature is usually between about 450° and 800° F. (between about 232° and 427° C.), depending upon the presence or absence of ammonia and the age of the catalyst; however, in view of the fact that the preferred catalysts of the present invention possess significantly greater activity that catalysts of the prior art, in some cases it may be possible to reduce the hydrocracking catalyst bed temperature by a amount commensurate with the increased activity of the catalysts of the invention. The liquid hourly space velocity (LHSV) typically is between 0.2 and 5 volumes of feedstock per hour per volume of catalyst, and preferably between 0.25 and 4.

The following examples were carried out to demonstrate the improved performance of LZ-210-T when employed as hydrocracking catalysts and are provided to illustrate the invention and are not intended to be limiting thereof. LZ-210-T was prepared using LZ-210 prepared according to the above-described general procedure using a standard commercially available zeolite Y having an initial $SiO_2$ to $Al_2O_3$ ratio as set in Table II. The $SiO_2$ to $Al_2O_3$ mole ratios of the LZ-210-T products were similar to i.e. substantially the same, as the LZ-210 starting material and such values are set forth in Tables I, II and III hereinafter. Unless otherwise stated, all parts and proportions are by weight. Examples 38 to 42 and 47 to 54 illustrate the preferred high activity, high octane catalysts of the present invention.

PREPARATIVE EXAMPLES

Examples 1 to 11 demonstrate the preparation of LZ-210-T and the hydrogenation component-containing LZ-210-T. Examples 12 to 18 show the preparation of comparative catalysts.

EXAMPLES 1 TO 11

Examples 1 to 11 set forth the preparations of LZ-210-T compositions including such when associated with a hydrogenation component. The catalysts prepared in examples 1 to 11 each involved an ammonium exchange preparative step with either ammonium nitrate or ammonium chloride. The ammonium exchange step was carried out one or more times to reduce the alkali metal content to less than 0.2. Each catalyst was hydrothermally treated (except examples 1, 4 and 5) by use of 100% steam at 600° C. for a period between about 1 and about 2 hours. Examples 1, 4 and 5 employed only 25 percent steam. The details of Examples 1 to 11 are set forth in Table I.

TABLE I

| Example | Si/Al$_2$[1] | Wt % Pd[2] | Wt % Base Metal[2] |
|---|---|---|---|
| 1[3] | 7.2 | 0.55 | — |
| 2 | 6.2 | 0.71 | — |
| 3 | 6.2 | 0.55 | — |

TABLE I-continued

| Example | Si/Al$_2$[1] | Wt % Pd[2] | Wt % Base Metal[2] |
|---|---|---|---|
| 4[3] | 9.0 | 0.55 | — |
| 5 | 9.0 | 0.64 | — |
| 6 | 6.2 | — | NiO: 4.7%; WO$_3$: 20.1% |
| 7 | 9.0 | — | NiO: 4.8%; WO$_3$: 20.9% |
| 8 | 6.2 | — | NiO: 4.7%; MoO$_3$: 15.4% |
| 9 | 9.0 | — | NiO: 4.9%; MoO$_3$: 15.8% |
| 10 | 6.2 | — | NiO: 4.7%; WO$_3$: 20.1% |
| 11 | 6.5 | — | NiO: 4.4%; WO$_3$: 19.8% |

[1]SiO$_2$ to Al$_2$O$_3$ ratio.
[2]Weight percent of hydrogenation component in final composition.
[3]The LZ-210 product was washed with a solution of soluble aluminum salt (aluminum sulfate or aluminum chloride) prior to use to remove excess residual fluoride instead of the standard wash with water.

EXAMPLES 12 TO 18

Examples 12, 13, and 15–18 are preparative examples for comparative catalysts. Example 14 is provided for comparison and is a catalyst prepared in accordance with the instant invention. The ammonium exchange has as that employed in Examples 1 to 11. The details of Examples 12 to 18 are set forth in Table II, in which "B" denotes steam treatment of the LZ-210, "C" denotes ammonium cation exchange and "D" denotes calcination in air without steam, and the steam treatment and/or ammonium cation exchange and/or calcination in air without steam are carried out in the specified order.

Example 16 was prepared with an LZ-210 having a SiO$_2$ to Al$_2$O$_3$ ratio of 7.4; the LZ-210 was slurried with a ten percent by weight aqueous ammonium chloride solution by employing one part by weight of the LZ-210 and 10 parts by weight of the ammonium chloride solution. The resulting slurry was then refluxed for one hour. The resulting mixture was decanted and the product washed to remove substantially all chloride. This procedure was then repeated two more times. A hydrogenation component was added to the above ammonium-exchanged LZ-210 by slowly mixing (over about 1 hour) 6.3 milliliters of an aqueous solution of palladium ethylene diamine dichloride containing 0.025 grams of palladium per milliliter of solution, with a slurry of 229 grams of the LZ-210 (1 gram of LZ-210 per 10 milliliters of water). The mixture was stirred for about one hour and filtered and water washed. The final product contained about 0.68 weight percent palladium.

TABLE II

| Example | Si/Al$_2$[1] | Treatment | Thermal[2] | Wt % Pd[3] | Wt % Base Metal[3] |
|---|---|---|---|---|---|
| 12[4] | 8.3 | BC | 25% (600° C.) | 0.68 | — |
| 13[5] | 8.7 | C | — | 0.68 | — |
| 14[6] | 6.2 | BC | 100% (600° C.) | 0.68 | — |
| 15[7] | 9.6 | — | — | 0.53 | — |
| 16[8] | 7.4 | CD | 600° C. | 0.54 | — |
| 17[9] | 4.9 | CBC | 100% (600° C.) | 0.54 | — |
| 18[10] | 5.2 | C | — | — | NiO: 5.0%; Mo$_2$O$_3$: 15.0% |

[1]SiO$_2$ to Al$_2$O$_3$ ratio of aluminosilicate. Examples 14, 15 and 16 are derived from LZ-210 zeolites. Examples 12, 13, 17 and 18 are zeolites as described in footnotes 4 to 10.
[2]Thermal treatment with weight percent steam, if any, and temperature indicated. The thermal treatment was typically carried out for a period between about 1 and about 2 hours.
[3]Weight percent of hydrogenation component in final composition, based on the total final weight.
[4]Y-zeolite prepared according to U.S. Pat. No. 3,442,795 by use of HCl/EDTA treatment.
[5]Y-zeolite prepared by acid treating a Y zeolite.
[6]Example 14 is not a comparative example and is provided herein for convenient comparison with comparative Examples 12, 13 and 15 to 18.
[7]Prepared as in Example 22 of U.S. Pat. No. 4,503,023.
[8]Ammonium exchanged LZ-210 without thermal treatment.
[9]Prepared from a thermally stabilized Y zeolite which is a commercially available catalyst. Example 17 is a reference catalyst (Y-zeolite) with a noble metal hydrogenation component.
[10]Commercially available Y-zeolite which has been ammonium-exchanged. Example 18 is a reference catalyst with a base metal hydrogenation component.

EXAMPLES 19 TO 27

Examples 19 to 27 were carried out to determine the activity of selected catalysts in both a first-stage and second stage hydrocracking process.

LZ-210-T catalysts were prepared as above described and tested for their utility as hydrocracking catalysts by employing such as hydrocracking catalysts in both first stage and second stage hydrocracking processes. The characteristic differences of first stage vs. second stage hydrocracking have been previously discussed. When a noble metal is employed as the hydrogenation component it is typically carefully reduced in a hydrogen atmosphere and when the hydrogenation component is a base metal it is typically treated with a sulfur compound.

Selected catalysts was evaluated by either one of two procedures. For convenient reference herein these procedures are referred to as "Procedure PA" and "Procedure PB" and are as follows:

Procedure PA comprised contacting the hydrocarbon feed (boiling between about 383° F. and about 732° F. (ASTM D-1160) with the selected catalyst. The first stage testing included adding 0.5 weight percent sulfur in the form of thiophene and 0.2 weight percent nitrogen in the form of t-butylamine to the feedstock. The second stage testing included the addition of 0.5 weight percent sulfur in the form of thiophene to the feedstock. In both cases the weight percents were based on the total weight of the feedstock. The hydrocracking process (first stage, second stage) was carried out at a pressure between about 1450 psig. and about 1500 psig. and at a LHSV (liquid hourly space velocity) of about 1.7. Hydrogen was introduced at a rate of about 8000 SCFB of feed (Standard Cubic feet per barrel of feedstock).

The performance of a given catalyst was evaluated by determining the activity temperature that a selected catalyst required to yield a product with a given API gravity after 100 hours of operation as a hydrocracking catalyst. For the first stage tests the API was 47° API gravity and after 100 hours of operation as a hydrocracking catalyst. For the first stage tests the API was 47°, for the second stage it was selected as 49.5° API gravity for determining the catalyst's activity temperature. A comparative catalyst (reference catalyst) comprising a commercially available Y zeolite was employed to provide for a comparison of LZ-210-T. The difference between the activity temperature of the reference catalyst and a given catalyst was expressed as a delta-value, i.e. the difference between the activity temperatures as compared against the reference catalyst. A positive delta-value indicates the catalyst had decreased activity while a negative value indicated that the catalyst had increased activity. When a selected catalyst was tested for both first and second stage activity the second stage activity was carried out first to avoid poisoning the catalyst with the NH3 via hydrocracking of the nitrogen compound.

When a "delta value" is given for a given catalyst the value has been computed by comparison to a reference catalyst as prepared in Example 18 or 17, depending on whether the hydrogenation component is a noble metal or base metal. The "delta value" for each catalyst and the relevant reference catalyst wherein both are evaluated under similar process conditions and in the same experimental apparatus. Thus, the comparison with the reference catalyst is carried out at the same process conditions as the catalyst with which it is compared to obtain the delta value but these process conditions are not the same each time the reference catalyst is compared with a selected catalyst, such process conditions being similar to those employed for the catalyst being compared.

The "delta" value for a given catalyst is a commercially significant value since the overall kinetics of a hydrocracking process involves deactivation of the catalyst with time which requires the constant incremental increase in the operating temperature of the process as a function of time to maintain constant conversion of the hydrocarbon feedstock. The process equipment necessarily has temperature constraints such that when the process reaches a designated temperature the process must be shut down, i.e., terminated, and the catalyst changed. Since these shutdowns are quite costly, a catalyst which provides the desired conversion at comparable deactivation rates and at a lower temperature (as indicated by a negative delta) has a longer life in the hydrocracking process since it requires a longer time to achieve the shutdown temperature. For example, the typical temperature increment for a commercial hydrocracking process is on the order of 0.05 to 0.1 degrees per day of operation and a catalyst which has a negative delta of 10 can provide from 100 to 200 additional days, thus six months or more extension of plant operation before catalyst changeover.

Procedure PB comprised a procedure which generated sufficient data for a plot of temperature vs. conversion for a selected catalyst to provide for comparisons between various catalysts at a given conversion. Procedure PB involved adjustment of the reactor temperature during a catalyst's evaluation to provide products which had API gravities of 47°, 48.5°, 50° and 51.5°. Material balances and simulated distillations (ASTM D-2887) were carried out for each of these products. The resulting temperature vs. conversion plot was employed to make comparisons with respect to the activities of various catalysts at a selected conversion level.

The hydrocracking experiments (both Procedures PA and PB) were carried out by introducing a selected feedstock to a stainless steel reactor having an axial thermowell. The temperature in the reactor was monitored by thermocouple in the thermowell. The catalyst was in the form of extrudates (80 or 85 parts by weight zeolitic component to, respectively, 20 or 15 parts by weight alumina on a metal-free basis) and was placed in the reactor and mixed with quartz chips to minimize reactor hot spots.

The present examples and examples hereinafter employ two feedstocks. The feedstocks are referred to herein for convenience as Feedstocks I and II. Feedstocks I and II are characterized by the following physical characteristics:

|  | FEEDSTOCK | |
| --- | --- | --- |
|  | I | II |
| Boiling Range (ASTM D-1160)F (Volume Percent) | | |
| IBP | 316 | 383 |
| 5 | 404 | 402 |
| 10 | 412 | 410 |
| 50 | 495 | 508 |
| 90 | 687 | 692 |
| 95 | 720 | 727 |
| EP | 789 | 732 |
| COMPOSITION (VOLUME %) | | |
| Total Aromatics | 21.4 | 27.3 |
| Mono Aromatics | 20.1 | 23.9 |
| Diaromatics | 0.3 | 0.3 |
| Triaromatics | 1.0 | 2.1 |
| Tetraaromatics | 0 | 0.5 |
| Pentaaromatics | 0 | 0.5 |
| Total Olefins | 0 | 0 |
| Total Saturates | 77.9 | 72.8 |

The improvement in second stage performance for LZ-210-T based catalysts is readily seen by reference to the negative delta values in Table III wherein Procedure PA was employed to evaluate the zeolites. In addition, comparisons with several other dealuminated Y-based catalysts were carried out as indicated by the zeolites employed to prepare the catalyst.

TABLE III

| EXAMPLE | CATALYST (Example Prepared) | SECOND STAGE[1] (°F.) | DELTA, °F. | FIRST STAGE[1] (°F.) | DELTA, °F. | FEED[2] |
| --- | --- | --- | --- | --- | --- | --- |
| 19 | 1 | 500 | +10 | 670 | −10 | II |
| 20 | 2 | 498 | −10 | 692 | −6 | I |
| 21 | 3 | 502 | −6 | 693 | −4 | I |
| 22 | 4 | 523 | +16 | — | — | I |
| 23 | 5 | — | — | 691 | −6 | I |
| 24 | 13 | 552 | +57 | 715 | +30 | II |
| 25 | 16 | 499 | +9 | 703 | +20 | I |
| 26 | 17 | — | 0 | — | 0 | II |
| 27 | 12 | 504 | +9 | 688 | +3 | II |

[1]The temperature (°F.) is the temperature required to achieve an API gravity of 49.5° and 47°, respectively, in second and first stage hydrocracking. The "delta" value is then calculated.
[2]Hydrocarbon Feedstock

EXAMPLES 28 TO 34

Examples 28 to 34 were carried out according to the experimental procedure described for Examples 19 to 27 employing catalysts using the zeolites prepared in Examples 6 to 11 and 18 as shown in Table IV. The catalyst was an extrudate formed from a mixture of 60 parts by weight of the zeolite component and 20 parts by weight alumina. The results in Table IV show that LZ-210-T exhibited improved single-stage performance when associated with a base metal hydrogenation component (typically employed in single-stage processes) relative to a commercial base metal catalyst using a zeolite Y base (Example 18).

TABLE IV

| EXAMPLE | CATALYST (Example Prepared) | FIRST STAGE[1] (°F.) | DELTA, °F. | PROCEDURE[2] | FEED[3] |
|---|---|---|---|---|---|
| 28 | 6 | 711 | −11 | PB | II |
| 29 | 7 | 706 | −16 | PB | II |
| 30 | 8 | 715 | −4 | PA | II |
| 31 | 9 | 708 | −11 | PA | II |
| 32 | 10 | 711 | −11 | PB | II |
| 33 | 11 | 710 | −9 | PA | II |
| 34 | 18 | 719 | 0 | PA | II |

[1] Delta values were evaluated in comparison to the typical commercial catalyst as prepared in Ex. 18 and employed in Ex. 34.
[2] Procedure PA or Procedure PB
[3] Hydrocarbon Feedstock

EXAMPLES 35 to 37

Examples 35 to 37 were carried out to evaluate the hydrothermal stability of: (1) an acid washed zeolite Y; (2) an EDTA extracted zeolite Y; and (3) LZ-210, respectively. The zeolites were ammonium exchanged to provide zeolites with similar $Na_2O$ contents. Each zeolite was steam deactivated by placing the zeolites in a hot furnace (873° C.±4° C.) in the presence of 23% ±2% by volume steam in air for five hours. The zeolites were then hydrated at room temperature (18° C. to 22° C.) for at least 48 hours. The percent oxygen retention, percent surface retention and percent X-ray retention (XRD) were measured by the procedure described in U.S. Pat. No. 4,503,023 for each zeolite with a higher overall retention, indicating the zeolite would be expected to be more stable towards the hydrothermal conditions found in catalytic cracking processes, accordingly, and have a longer catalyst life. The "Average Retention" values in Table V show that LZ-210 has a higher average retention, and accordingly should exhibit improved catalyst life.

TABLE V[1]

| Example | 35 | 36 | 37 |
|---|---|---|---|
| $SiO_2/Al_2O_3$ | 8.8 | 8.1 | 8.4 |
| % $O_2$ Retention[2] | 49.2 | 26.0 | 47.9 |
| % Surface Area Retention[2] | 45.9 | 19.4 | 46.6 |
| % XRD Retention[2] | 54.2 | 19.3 | 57.9 |
| Average Retention | 49.8 | 21.6 | 50.8 |

[1] Crystal retention after steaming in 23% steam at 870° C. for 17 hours.
[2] Carried out according to procedure of U.S. Pat. No. 4,503,023 as hereinbefore referenced.

EXAMPLE 38

This Example illustrates the preparation of a high activity, high octane catalyst of the present invention containing 20 percent of an alumina binder, 5 percent of nickel (as NiO) and 20 percent of tungsten (as $WO_3$).

An LZ-210 zeolite, prepared in accordance with the aforementioned U.S. Pat. No. 4,503,023 and having a silica/alumina ratio of 18.1, was heated to 500° C. in a 100 percent steam atmosphere for 1 hour to obtain an ao of 24.386 Å and a∆a₀ of 0.032 Å. The steam-treated material was then ion-exchanged for one hour at 27° C. with a 10 weight percent aqueous solution of ammonium nitrate, the weight of ammonium nitrate salt used being one gram per gram of steam-treated zeolite. Following this ion-exchange, the zeolite was washed with water and dried at 100° C.

The steamed, ammonium-exchanged zeolite, which weighed 80 g., was added to a small laboratory-size muller and mulled for 10 minutes. 20 G. (on an anhydrous basis) of alumina was peptized by adding 2.5 ml. of 70% w/w nitric acid and 50 ml. of water, and the peptized alumina was added to the muller, whereafter the mulling was continued for a further 15 minutes. Following this second mulling, 50 ml. of additional water was added to the muller and the contents of the muller mixed to produce an extrudable mass. This mass was extruded to form pellets 1/16 inch (about 1.5 mm.) in diameter and the extrudates were calcined at 500° C. The adsorption capacity of the extrudate was measured (by weighing the water uptake of the extrudate immersed in an excess of water for 10 minutes, filtering and weighing the wet extrudate) and found to be 0.76 ml/g.

To effect incorporation of metals into the hydrocracking catalyst precursor thus prepared, 19.38 g. of nickel(II) nitrate hexahydrate ($Ni(NO_3)_2.6H_2O$) were dissolved in 25 ml. of water, and 24.23 g. of ammonium metatungstate were separately dissolved in 25 ml. of water. The two resultant solutions were combined and additional distilled water added to give a total volume of 60 ml. The extrudate (75 g.) was added to this solution, and the resultant mixture agitated to ensure uniform loading of the zeolite. The metal-loaded extrudate was then dried at 100° C. overnight and calcined at 500° C. The final catalyst was prepared to have metal loadings of 5 percent NiO and 20 percent $WO_3$, based on the weight of the catalyst itself.

EXAMPLE 39

This Example illustrates the preparation of a high activity, high octane catalyst of the present invention containing 20 percent of an alumina binder, 5.1 percent of nickel (as NiO) and 19.1 percent of tungsten (as $WO_3$).

An LZ-210 zeolite, prepared in accordance with the aforementioned U.S. Pat. No. 4,503,023 and having a silica/alumina ratio of 9.0, was heated to 550° C. in a 100 percent steam atmosphere for 1 hour to obtain an ao of 24.411 Å and a₁a₀ of 0.088 Å. The steam-treated material was then ion-exchanged for one hour under reflux with a 10 weight percent aqueous solution of ammonium nitrate, the weight of ammonium nitrate salt used being one gram per gram of steam-treated zeolite. Following this ion-exchange, the zeolite was washed with water, and the solids separated by filtration and dried at 100° C.

The steamed, ammonium-exchanged zeolite, which weighed 120 g., was added to a small laboratory-size muller and mulled for 10 minutes. 30 G. (on an anhydrous basis) of alumina was peptized by adding 4.2 ml. of 70% w/w nitric acid and 75 ml. of water, and the peptized alumina was added to the muller, whereafter the mulling was continued for a further 15 minutes. Following this second mulling, approximately 50 ml. of additional water was added to the muller and the contents of the muller mixed to produce an extrudable mass. This mass was extruded to form pellets 1/16 inch (about 1.5 mm.) in diameter and the extrudates were dried at 100° C. and then calcined at 500° C. The adsorption capacity of the extrudate was measured in the same way as in Example 38 above and found to be 0.55 ml/g.

To effect incorporation of metals into the hydrocracking catalyst precursor thus prepared, 19.38 g. of nickel(II) nitrate hexahydrate (Ni(NO₃)₂.6H₂O) were dissolved in 20 ml. of water, and 24.23 g. of ammonium metatungstate were separately dissolved in 20 ml. of water. The two resultant solutions were combined and additional distilled water added to give a total volume of 45 ml. The extrudate (75 g.) was added to this solution, and the resultant mixture agitated to ensure uniform loading of the zeolite. The metal-loaded extrudate was then dried at 100° C. overnight and calcined at 500° C. Analysis of the final catalyst showed metal loadings of 5.1 percent NiO and 19.1 percent WO₃, based on the weight of the finished catalyst itself.

EXAMPLE 40

This Example illustrates the preparation of a high activity, high octane catalyst of the present invention containing 20 percent of an alumina binder, 5 percent of nickel (as NiO) and 20 percent of tungsten (as Wo₃).

11,354 Grams of an LZ-210 zeolite (equivalent to 6,288 grams of anhydrous zeolite), prepared in accordance with the aforementioned U.S. Pat. No. 4,503,023 and having a silica/alumina ratio of 10.2, were placed in a stainless steel muller, together with 1,220 g. of distilled water, and the mixture was mulled for 5 minutes. An additional 250 ml. of distilled water was added to the muller, and the mulling continued for an additional 10 minutes. The resultant extrudable mass was extruded in a laboratory-size extruder running at 84 rpm. to form pellets ⅛ inch (about 3 mm.) in diameter and the extrudates were dried in fan-blown ambient air for 20 minutes, then in an oven at 100° C. overnight. The lost on ignition (LOI) at 1000° C. of the dried extrudate, after hydration under ambient conditions, was 21.7 percent, as opposed to 50.3 percent for the mulled material prior to extrusion.

This preliminary extrusion was effected only to assist retention of the zeolite in the kiln during steaming; the subsequent steaming and ion-exchange steps led to disintegration of the extrudate to a powder.

The extrudate was steamed in a 100 percent steam atmosphere for 1 hour using a Bartlett-Snow rotary kiln at a temperature of 600° C. and a steam flow rate rising from 5.4 lb/hour. (2.45 kg/hour) at the beginning of steaming to 5.8 lb/hour. (2.63 kg/hour.) at the end to obtain an ao of 24.411 Å and a₁a₀ of 0.089 Å. 11.25 Lb. (5.1 kg.) (on an anhydrous basis) of the steam-treated material was then ion-exchanged for one hour at 85° C. with an aqueous solution of ammonium nitrate. The ammonium ion-exchange was effected by adding 7.65 U.S. gallons (29.0 l.) of distilled water and 11.25 lb. (5.1 kg.) of ammonium nitrate salt to a large kettle and mixing well. The steamed zeolite was added to the kettle with mixing, and the contents of the kettle thereafter heated to 85° C. for one hour with continuous mixing.

Following this ion-exchange, solids were separated by filtration through an 18 inch (457 mm.) Shrivco filter press, washed with 12 U.S. gallons (45.4 l.) of distilled water. The entire ion-exchange and washing procedure was repeated twice more, except that the third washing was effected with 24 U.S. gallons (90.8 l.) of distilled water. The LOI of a sample removed from the filter press after the third filtration was 8.89 percent.

2948.4 Grams (on an anhydrous basis) of the steamed, ammonium-exchanged zeolite were added to a stainless steel muller. 737.1 Grams (on an anhydrous basis) of alumina were peptized by adding 155.5 g. of 70 percent nitric acid and 752.0 g. of distilled water to a Hobart mixer, and then adding the alumina to the mixer and mixing until a uniform dispersion was obtained. The peptized alumina thus produced was added to the muller and the resultant mixture mulled for 10 minutes. A further 1450 g. of distilled water was added to the muller, whereafter the mulling was continued for a further 15 minutes. Following this second mulling, the 1000° C. LOI of the mass was 44.8 percent.

The resultant extrudable mass was extruded in a large, instrumented extruder having a die containing 348 1/16 inch (approximately 1.5 mm.) capillaries per die and running at 40 rpm. to form pellets 1/16 inch in diameter and the extrudates were dried in an open mesh tray at 100° C. for approximately 14 hours, then calcined in an AGF rotary kiln at a 600° C. set-point temperature using a 200 SCFH (5.7 standard m³/hour) air purge. The resultant dried extrudate had a 1000° C. LOI of 1.91 adsorption capacity (measured at −183° C. and a partial pressure of 100 Torr after vacuum activation of the catalyst at 350° C. for 8 hours) of 24.9 percent and a pore volume of 0.649 ml/g.

To effect incorporation of metals into the hydrocracking catalyst precursor thus prepared, the batch of catalyst precursor was divided into three equal parts, and each of these parts treated as follows. 197.8 g. of nickel(II) nitrate hexahydrate (Ni(NO₃)₂.6H₂O) were dissolved in 148 ml. of distilled water at room temperature and 235.3 g. of ammonium metatungstate were separately dissolved in 148 ml. of distilled water. The two resultant solutions were combined and additional distilled water added to give a total volume of 493.6 ml. The 746.5 g. batch of extrudate was placed in a large rotating jar and the solution added by means of a solution feed tube at a rate of 60 ml/min. After all the solution had been added, the rotation was continued in order to ensure uniform metal loading. The three batches of metal-loaded extrudate were combined, then dried at 100° C. overnight in an oven. The dried extrudate was sized by screening and then calcined at 500° C. in an AGF rotary kiln using a 60 minute retention time and a 200 SCFH (5.7 m³/hour.) air purge. The final catalyst thus prepared had a 1000° C. LOI of 1.92 percent.

EXAMPLE 41

This Example illustrates the preparation of a high activity, high octane catalyst of the present invention containing 20 percent of an alumina binder, 5 percent of nickel (as NiO) and 2 percent of tungsten (as $WO_3$).

An LZ-210 zeolite, prepared in accordance with the aforementioned U.S. Pat. No. 4,503,023 and having a silica/alumina ratio of 10.9, was heated to 500° C. in a 100 percent steam atmosphere for 1 hour to obtain an ao of 24.431 Å and $\Delta a_o$ of 0.043 Å. The steam-treated material was then ion-exchanged for one hour at 27° C. with a 10 weight percent aqueous solution of ammonium nitrate, the weight of ammonium nitrate salt used being one gram per gram of steam-treated zeolite. Following this ion-exchange, the zeolite was washed with water and dried at 100° C.

The steamed, ammonium-exchanged zeolite, which weighed 144 g., was added to a small laboratory-size muller and mulled for 10 minutes. 36 G. (on an anhydrous basis) of alumina was peptized by adding 5 ml. of 70% w/w nitric acid and 90 ml. of water, and the peptized alumina was added to the muller, whereafter the mulling was continued for a further 10 minutes. Following this second mulling, in order to obtain an extrudable consistency, 50 ml. of additional water was added to the muller and the contents of the muller mixed to produce an extrudable mass. This mass was extruded to form pellets 1/16 inch (about 1.5 mm.) in diameter and the extrudates were calcined at 500° C. for 1 hour. The adsorption capacity of the extrudate was measured in the same way as in Example 38 above and found to be 0.65 ml/g.

To effect incorporation of metals into the hydrocracking catalyst precursor thus prepared, 46 g. of nickel(II) nitrate hexahydrate ($Ni(NO_3)_2.6H_2O$) were dissolved in 50 ml. of water, and 58.2 g. of ammonium metatungstate were separately dissolved in 50 ml. of water. The two resultant solutions were combined and additional distilled water added to give a total volume of 120 ml. The extrudate (180 g.) was added to this solution, and the resultant mixture agitated to ensure uniform loading of the zeolite. The metal-loaded extrudate was then dried at 100° C. overnight and calcined at 500° C. in the same way as in Example 40 above. The final catalyst was prepared to have metal loadings of 5 percent NiO and 20 percent $WO_3$, based on the weight of the catalyst itself.

EXAMPLE 42

This Example illustrates the preparation of a high activity, high octane catalyst of the present invention containing approximately 20 percent of an alumina binder, 5.1 percent of nickel (as NiO) and 19.1 percent of tungsten (as $WO_3$).

An LZ-210 zeolite, prepared in accordance with the aforementioned U.S. Pat. No. 4,503,023 and having a silica/alumina ratio of 10.9, was heated to 500° C. in a 100 percent steam atmosphere for 1 hour to obtain an ao of 24.450 Å and $\Delta a_o$ of 0.050 Å. The steam-treated material was then ion-exchanged for one hour under reflux with a 10 weight percent aqueous solution of ammonium nitrate, the weight of ammonium nitrate salt used being one gram per gram of steamtreated zeolite. Following this ion-exchange, the zeolite was separated by filtration, and the filter cake washed thoroughly with water.

100 Grams (on an anhydrous basis) of the steamed, ammonium-exchanged zeolite were added to a small laboratory-size muller and mulled for 10 minutes. 25 Grams (on an anhydrous basis) of alumina was peptized by adding 3.5 ml. of 70% w/w nitric acid and 62.5 ml. of water, and the peptized alumina was added to the muller, whereafter the mulling was continued for a further 15 minutes. Following this second mulling, approximately 50 ml. of additional water was added to the muller and the contents of the muller mixed to produce an extrudable mass. This mass was extruded to form pellets 1/16 inch (about 1.5 mm.) in diameter and the extrudates wer dried at 100° C. and then calcined at 500° C.

To effect incorporation of metals into the hydrocracking catalyst precursor thus prepared, 19.38 g. of nickel(II) nitrate hexahydrate ($Ni(NO_3)_2.6H_2O$) were dissolved in 20 ml. of water, and 24.23 g. of ammonium metatungstate were separately dissolved in 20 ml. of water. The two resultant solutions were combined and additional distilled water added to give a total volume of 45 ml. The extrudate was added to this solution, and the resultant mixture agitated to ensure uniform loading of the zeolite. The metal-loaded extrudate was then dried at 100° C. overnight and calcined at 500° C. The extrudate was screened to 10–14 U.S. mesh and the adsorption capacity of the screened extrudate was measured and found to be 0.5 ml/g. Chemical analysis showed that the final catalyst contained 5.1 percent NiO and 19.1 percent $WO_3$.

EXAMPLE 43

This Example illustrates the preparation of a hydrocracking catalyst having a metal content similar to that of the catalyst prepared in Example 38 above, but prepared from a zeolite having a lower silica/alumina ratio of 6.5.

150 G. of an LZ-210 zeolite, prepared in accordance with the aforementioned U.S. Pat. No. 4,503,023 and having a silica/alumina ratio of 6.5, were heated to 600° C. in a 100 percent steam atmosphere for 1 hour to obtain an $a_o$ of 24.538 Å and $\Delta a_o$ of 0.063 Å. (Thus, the catalyst produced from this steam-treated zeolite was not a high activity, high octane catalyst of the present invention, since the final $a_o$ value was too high.) The steam-treated material was then ammonium ion-exchanged in the same manner as in Example 38 above.

The steamed, ammonium-exchanged zeolite was added to a small laboratory-size muller and mulled dry for 10 minutes. 37.5 g. (on an anhydrous basis) of alumina was peptized by adding 5 ml. of 70% w/w nitric acid and 90 ml. of water, and the peptized alumina was added to the muller, whereafter the mulling was continued for a further 15 minutes. Following this second mulling, 50 ml. of additional water was added to the muller and the contents of the muller were mixed by further mulling to produce an extrudable mass. This mass was extruded to form pellets 1/16 inch (about 1.5 mm.) in diameter and the extrudates were dried at 100° C., then calcined at 500° C. The adsorption capacity of the extrudate was measured in the same way as in Example 38 above and found to be 0.74 ml/g.

To effect incorporation of metals into the hydrocracking catalyst precursor thus prepared, 38.76 g. of nickel(II) nitrate heptahydrate ($Ni(NO_3)_2.6H_2O$) were dissolved in 50 ml. of water, and 48.45 g. of ammonium metatungstate were separately dissolved in 50 ml. of water. The two resultant solutions were combined and additional distilled water added to give a total volume of 105 ml. The extrudate (150 g.) was added to this solution, and the resultant mixture aitated to ensure uniform loading of the zeolite. The metal-loaded extrudate was then air-dried and calcined at 500° C. The catalyst was prepared to have metal loadings of 5 percent NiO and 20 percent $WO_3$, based on the weight of the catalyst itself.

EXAMPLE 44

This Example illustrates the preparation of a hydrocracking catalyst having a metal content similar to that of the catalyst prepared in Example 38 above, but prepared from a zeolite having a lower silica/alumina ratio of 6.5

Steam-treated LZ-210 zeolite was prepared in the same way as in Example 43 above, except that the steaming was carried out at 650° C. to obtain an $a_o$ of 24.472 Å and $\Delta a_o$ of 0.129 (Thus the catalyst produced from this steam-treated zeolite was not a high activity, high octane catalyst of the present invention, since the final $a_o$ and $\Delta a_o$ values were too high.). However, the ammonium ion-exchange was effected using a 10 weight percent solution of ammonium chloride instead of ammonium nitrate and was carried out twice, each time for one hour, with fresh solution being used for each ion-exchange. After the second ion-exchange, the solids were washed with distilled water until the washings were chloride-free.

120 G. of the steamed, ion-exchanged zeolite, 30 g. of alumina and 6.5 g. of Avicel (Avicel is a Registered Trade Mark; this material wa obtained from FMC Corporation, and contains 85 percent microcrystalline cellulose and 15 percent carboxymethylcellulose and was in the form of 400 U.S. mesh powder in 150 ml. of water) were mixed in a Hobart mixer for 30 minutes, and then an additional 30 grams of peptized alumina, prepared in the same way as in Example 38 above, were added and the resultant mixture mixed for an additional 30 minutes. The final mixture was extruded, dried and calcined in the same way as in Example 38 above. The adsorption capacity of the extrudate was measured in the same way as in Example 38 above and found to be 0.75 ml/g.

To effect incorporation of metals into the hydrocracking catalyst precursor thus prepared, 19.39 g. of nickel(II) nitrate hexahydrate ($Ni(NO_3)_2.6H_2O$) were dissolved in 25 ml. of water, and 21.81 g. of ammonium metatungstate were separately dissolved in 25 ml. of water. The two resultant solutions were combined and additional distilled water added to give a total volume of 58 ml. The extrudate (77 g.) was added to this solution, and the resultant mixture agitated to ensure uniform loading of the zeolite. The metal-loaded extrudate was then dried at 100° C. overnight and calcined at 500° C. The final catalyst was prepared to have metal loadings of 5 percent NiO and 18 percent $WO_3$, based on the weight of the catalyst itself.

EXAMPLE 45

This Example illustrates the preparation of a hydrocracking catalyst similar to that of the catalyst prepared in Example 38 above, but which is not a high activity, high octane catalyst of the present invention since, although it has an $a_o$ of less than 24.45 Å, it has a $\Delta a_o$ greater than 0.1 Å.

An LZ-210 zeolite, prepared in accordance with the aforementioned U.S. Pat. No. 4,503,023 and having a silica/alumina ratio of 9.0, was heated to 600° C. in a 100 percent steam atmosphere for 1 hour to obtain an ao of 24.379 Å and $\Delta a_o$ of 0.120 Å. The steam-treated material was then ammonium ion-exchanged in the same manner as in Example 38 above.

The steamed, ammonium-exchanged zeolite (600 g.) was added to a small laboratory-size muller and mulled dry for approximately 5 minutes. 150 Grams (on an anhydrous basis) of alumina was peptized by adding 21 ml. of 70% w/w nitric acid and 170 ml. of water, and the peptized alumina was added to the muller, whereafter the mulling was continued for a further 30 minutes. Following this second mulling, 400 ml. of additional water was added to the muller and the contents of the muller were mixed by further mulling to produce an extrudable mass. This mass was extruded to form pellets 1/16 inch (about 1.5 mm.) in diameter and the extrudates were dried at 100° C., then calcined at 500° C. The adsorption capacity of the extrudate was measured and found to be 0.5 ml/g.

To effect incorporation of metals into the hydrocracking catalyst precursor thus prepared, 48.45 g. of nickel(II) nitrate hexahydrate ($Ni(NO_3)_2.6H_2O$) were dissolved in 40 ml. of water, and 60.58 g. of ammonium metatungstate were separately dissolved in 40 ml. of water. The two resultant solutions were combined and additional distilled water added to give a total volume of 95 ml. 187 Grams (on an anhydrous basis) of the extrudate were added to this solution, and the resultant mixture agitated to ensure uniform loading of the zeolite. The metal-loaded extrudate was then air-dried and calcined at 500° C.

EXAMPLE 46

This Example illustrates the hydrocracking properties of the catalysts prepared in Examples 38–45, together with similar data relating to two commercial hydrocracking catalysts.

The test procedure used was as follows. The catalysts were employed in the first stage of a two-stage hydrocracking process, using as the feedstock a gas oil boiling over the range of 332° to 853° F. (167° to 456° C.) by ASTM test method D-2887, having an American Petroleum Institute (API) gravity of 37.9, containing about 5,000 ppm. of sulfur and 2,000 ppm. of nitrogen, and having a specific gravity of 0.8341 at 60° F. (15.6° C.). The chemical analysis of the feedstock was:

|  | Volume Percent |
| --- | --- |
| Total Aromatics | 24.7 |
| Monoaromatics | 19.0 |
| Diaromatics | 3.1 |
| Triaromatics | 1.2 |
| Tetraaromatics | 0.6 |
| Pentaaromatics | 0.8 |
| Total Saturates | 75.4 |

The hydrocracking process was carried out at a pressure of approximately 1450 psig. (10 Mpa.), a temperature in the range of from 680°–720° F. (360°–382° C.) and at a liquid hourly space velocity (LHSV) of 1.7. Hydrogen was introduced at a rate of approximately 8000 SCFB (226 standard $m^3$/barrel) of feedstock.

The apparatus used was a stainless steel reactor having an axial thermowell, in which were disposed thermocouples used to monitor the reaction temperature.

The catalyst, in the form of the aforementioned extrudates, was placed in the reactor in admixture with quartz chips, which served to minimize reactor hot spots.

All runs were carried out under mass balance conditions with product samples taken at various temperatures for analysis to give the product data as a function of average reaction temperature or weight percent conversion. The light gas fraction, heavy gas fraction and unreacted feedstock from the reactor effluent were collected and measured quantitatively by American Society for Testing and Materials (ASTM) simulated distillation t determine the yields of the light and heavy gasoline fractions and yield of converted product. Liquid products were also analyzed by capillary gas column chromatography to separate and identify all components in the light gasoline fraction; components thus identified included 2-methylbutane, n-pentane, 2,3-dimethylbutane, 2-methylpentane, 3-methylpentane, n-hexane, methylcyclopentane, 2,4-dimethylbutane, cyclohexane and benzene. The data from these analyses were used to calculate the RON and MON by volume percent averaging of the blending octane numbers of the individual components, as described in ASTM Technical Publication No. 225, "Knocking Characteristics of Pure Hydrocarbons" (1958).

The two commercial catalysts used were HC-14, a commercial base metal hydrocracking catalyst sold by Union Carbide Corporation, and HC-18, a noble metal hydrocracking catalyst also sold by Union Carbide Corporation.

Table VI below shows the initial silica/alumina ratio, the initial and "final" unit cell dimensions and the change in this dimension ($\Delta a_o$), as determined by X-ray powder diffraction analysis; the "final" unit cell dimension was determined on the steamed, ammonium ion-exchanged zeolite before metal-loading. This Table also shows the activity of the catalyst, expressed as the temperature in ° F necessary to achieve 45 percent conversion of a standard feedstock to products boiling below 420° F. (215.6° C.), the activities being measured after 100 hours of hydrocracking; this activity is also expressed as a difference (T, in °F.) between the temperature required for a specific catalyst and that required by the HC-14 catalyst at the same conversion. Table VI further shows the calculated RON for the light gasoline fraction (the fraction boiling below 185° F., 85° C.) produced by each catalyst at 60 percent conversion of the standard feedstock to products boiling below 420° F., the difference (RON) between this RON and the value obtained for the HC-14 catalyst, and the yields of light and heavy gasoline (the fraction boiling in the range of 185° to 420° F., 85 to 215.6° C.) as a percentage of the weight of the feedstock.

From the data in Table VI, it will be seen that the high activity, high octane catalysts of the invention having a final $a_o$ not greater than 24.45 Å and as $\Delta a_o$ not greater than 0.1 Å achieved outstanding results, with hydrocracking activities approximately 15 to 20° F. better than the state-of-the-art base metal catalyst HC-14, and RON's 1.5 to 2.5 units better than HC-14. Indeed, the results achieved with the high activity, high octane catalysts of the present invention are as good as, and in some cases better than, those achieved with the state-of-the-art noble metal catalyst HC-18.

In FIG. 1, the activities of the various catalysts given in Table VI (except for that of Example 38, which has a silica/alumina ratio very different from that of the remaining catalysts) are plotted against the final unit cell dimensions. From FIG. 1, it will be seen that there is a good linear correlation between hydrocracking activity and unit cell dimension; regression analysis gives:

Hydrocracking Activity = $69.92 a_o - 1724$, with a coefficient of correlation of 0.91. The relevant regression line is shown in FIG. 1. From FIG. 1, it will be seen that, in order to produce a hydrocracking catalyst of the present invention having an activity at least equal to that of the state-of-the-art noble metal catalyst HC-18, the unit cell dimension of the steamed zeolite should be not less that about 24.41 Å.

Figure 2:
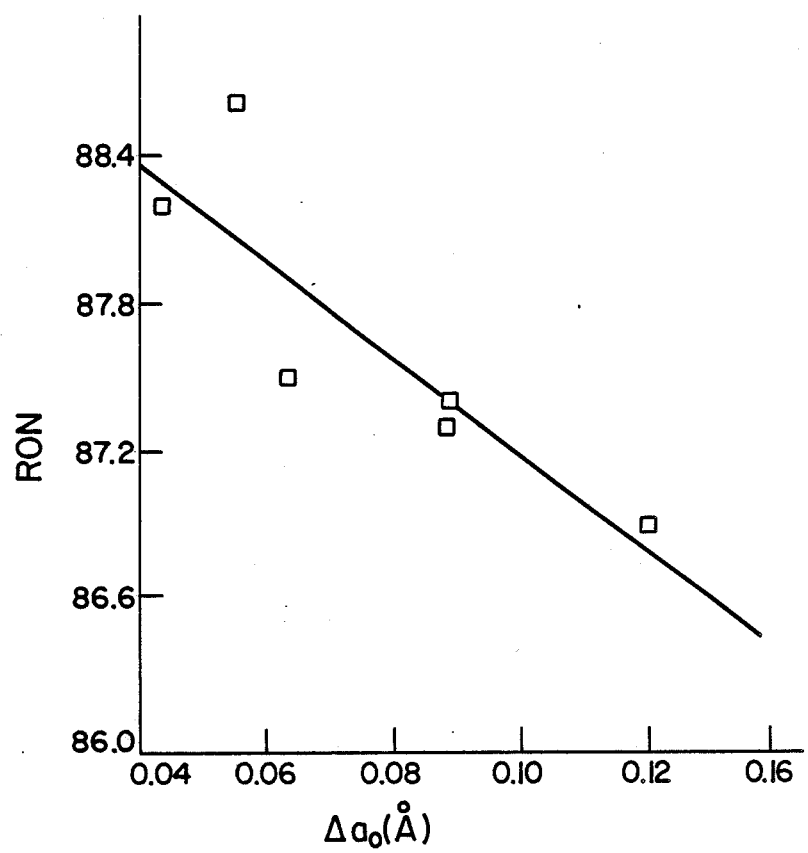
FIG. 2 is a graph showing the variation in octane number of the light gasoline fraction of the hydrocracked products with the change in the unit cell dimension occurring during steaming, as described in certain Examples below.

In FIG. 2, the RON of the light gasoline fraction produced by the various catalysts in Table VI (again, the catalyst of Example 38 is omitted) is plotted against the change in unit cell dimension ($a_o$) during steaming. From FIG. 2, it will be seen that there is a good linear correlation between RON and $a_o$; regression analysis gives:

LG RON = $89.1 - 19.3 a_o$ with a coefficient of correlation of 0.93. The relevant regression line is shown in FIG. 2. From FIG. 2, it will be seen that, in order to produce a light gasoline fraction having a RON at least equal to that of the light gasoline fraction produced by the state-of-the-art noble metal catalyst HC-18, the change in the unit cell dimension of the steamed zeolite should be not greater that about 0.08 Å.

Figure 3:
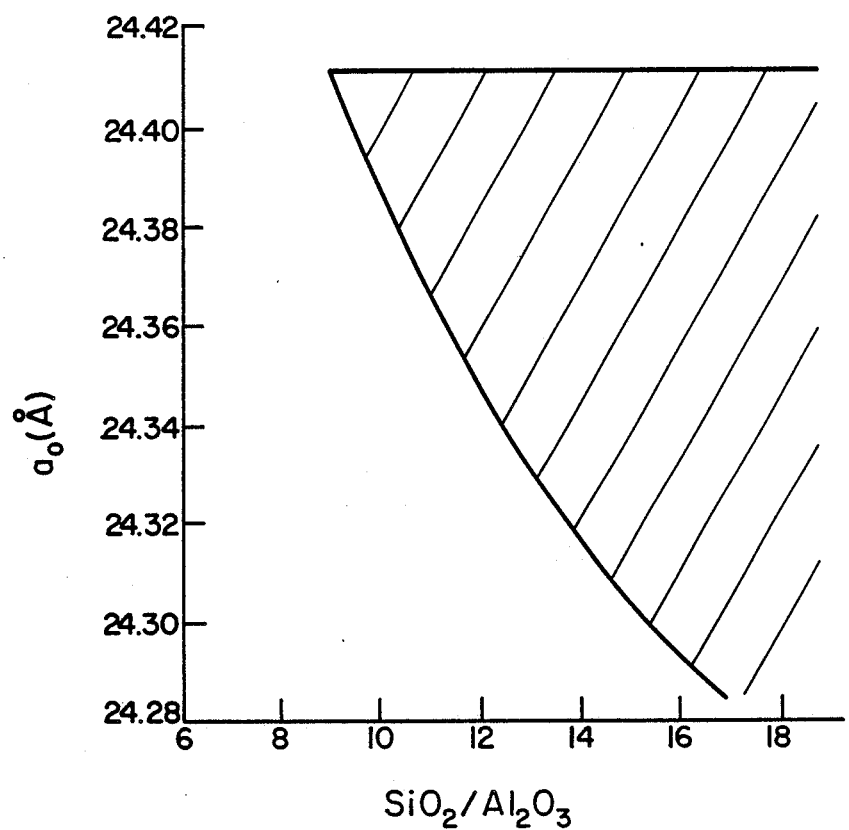
FIG. 3 shows the preferred region for carrying out the process of the present invention in terms of the silica:alumina ratio of the Y-type zeolite starting material and the unit cell dimension of the steamed product.

FIG. 3 uses data from FIGS. 1 and 2 to define the parameters for preferred processes of the present invention which produce catalysts having activities and RON's equal to those of the state-of-the-art noble metal hydrocracking catalyst HC-18. In FIG. 3, the horizontal line represents an activity of $\Delta T = -16°$ F., relative to

TABLE VI

| Ex. # | Initial Silica/ Alumina Ratio | Unit Cell Dimension (Å) | | | Activity (°F.) | | LG Octane | | Gasoline Yield (percent) | |
|---|---|---|---|---|---|---|---|---|---|---|
| | | Initial | Final | $a_o$ | Actual | $\Delta$ | RON | $\Delta$RON | Light | Heavy |
| 38 | 18.1 | 24.418 | 24.386 | 0.032 | 692 | −14 | 87.7 | +2.0 | — | — |
| 39 | 9.0 | 24.499 | 24.411 | 0.088 | 691 | −15 | 87.3 | +1.6 | 5.9 | 34.7 |
| 40 | 10.2 | 24.500 | 24.411 | 0.089 | 688 | −18 | 87.5 | +1.8 | 4.7 | 35.9 |
| 41 | 10.9 | 24.474 | 24.431 | 0.043 | 689 | −17 | 88.2 | +2.5 | 4.8 | 34.9 |
| 42 | 10.2 | 24.500 | 24.450 | 0.050 | 695 | −11 | 88.6 | +2.9 | 5.0 | 34.8 |
| 43 | 6.5 | 24.601 | 24.538 | 0.063 | 698 | −8 | 87.5 | +1.8 | 5.1 | 34.5 |
| 44 | 6.5 | 24.601 | 24.472 | 0.129 | 693 | −13 | 86.6 | +0.9 | 4.5 | 35.4 |
| 45 | 9.0 | 24.499 | 24.379 | 0.120 | 687 | −19 | 86.9 | +1.2 | 4.5 | 35.4 |
| HC-14 | 5.0 | — | — | — | 706 | — | 85.7 | — | 4.1 | 33.7 |
| HC-18 | 5.0 | — | — | — | 694 | −12 | 87.7 | +2.0 | 5.4 | 34.9 |

HC-14, which results in a requirement for $a_o$ of the steamed zeolite being less than abou 24.41 Å. The lower curve is for a RON of 87.5 and is calculated by combining the straight line in FIG. 2 with the Breck equation for the unit cell dimension. The shaded area between the horizontal line and the curve results in the relationship between initial silica/alumina ratio and final ao already stated above.

EXAMPLES 47-55

Following the experiments described in Examples 38–46 above, further work was done to optimize the parameters of the preferred hydrocracking catalysts of the present invention. For this purpose, LZ-210 zeolites having a variety of silica/alumina ratios were steamed at various temperatures, ammonium ion-exchanged, mixed with alumina binders and loaded with 5 percent NiO and 20 percent WO$_3$, in substantially the same manner as in Example 38 above. The activities of the catalysts were then tested in the same way as in Example 46 above.

It should be noted that, because steaming of the zeolites in these Examples was conducted on a substantially larger scale than in Examples 38–42, and using rotary kilns rather than laboratory-scale apparatus, simple thermocouple measurements of steaming temperature proved to be unreliable. Accordingly, the effect of steaming was measured by following the unit cell dimension of the zeolite and developing a relationship between steaming furnace parameters and zeolite unit cell dimension in the product. This method was found to give an accurate and reliable measurement of the zeolite steaming conditions.

The catalysts were evaluated in the first stage of a two-stage hydrocracking process using a standard, commercial gas oil feedstock, a hydrogen pressure of 1470 psig. (10.14 MPa.), a hydrogen flow rate of 10,000 SCFB (283 m$^3$/barrel) and an LHSV of 1. Runs were conducted at temperatures from 680° to 740° F. (360° to 393° C.). The reactor effluent was collected and the quantity of products boiling below 420° F. (215.6° C.) determined.

All runs were carried out under mass balance conditions with products taken at various temperatures corresponding to American Petroleum Institute (API) values of 47°, 49°, 51° and 53°. The complete product from each hydrocracking run, comprising gas fraction, light gasoline fraction, heavy gasoline fraction and unreacted feedstock was collected. The resultant liquid samples were analyzed by American Society for Testing and Materials (ASTM) Method D-2887 simulated distillation techniques to measure quantitatively the yields of light gasoline, heavy gasoline and unreacted feedstock. The liquid samples were also analyzed by capillary column gas chromatography to separate and identify all the components of the light gasoline fraction, as well as most of the components of the heavy gasoline fraction. The analyses of the light gasoline fraction were used to calculate its RON by volume averaging the blending octane numbers of the individual components.

The results obtained in these experiments are set forth in Table VII below. The column headed " $\Delta$T" gives the activity relative to the aforementioned prior art base metal hydrocracking catalyst HC-14, measured after 100 hours operating time of the catalyst. The RON's are measured at 60 percent total conversion of the feedstock.

TABLE VII

| Ex. # | Initial Silica/Alumina Ratio | Steaming Temp. (°C.) | Unit Cell Dimension (Å) Final | $\Delta a_o$ | $\Delta$T (°F.) | RON |
|---|---|---|---|---|---|---|
| 47 | 10.9 | 500 | 24.383 | 0.093 | −15 | 88.0 |
| 48 | 9.0 | 500 | 24.463 | 0.036 | −10 | 87.9 |
| 49 | 9.7 | 500 | 24.424 | 0.080 | −11 | 88.1 |
| 50 | 12.0 | 500 | 24.397 | 0.072 | −17 | 87.7 |
| 51 | 12.0 | 500 | 24.453 | 0.019 | −9 | 88.1 |
| 52 | 12.0 | 500 | 24.453 | 0.019 | −10 | 88.3 |
| 53 | 12.0 | 500 | 24.420 | 0.019 | −12 | 87.7 |
| 54 | 11.8 | 500 | 24.407 | 0.062 | −15 | 87.6 |
| 55 | 9.0 | 600 | 24.379 | 0.120 | −19 | 86.9 |

Figure 4:
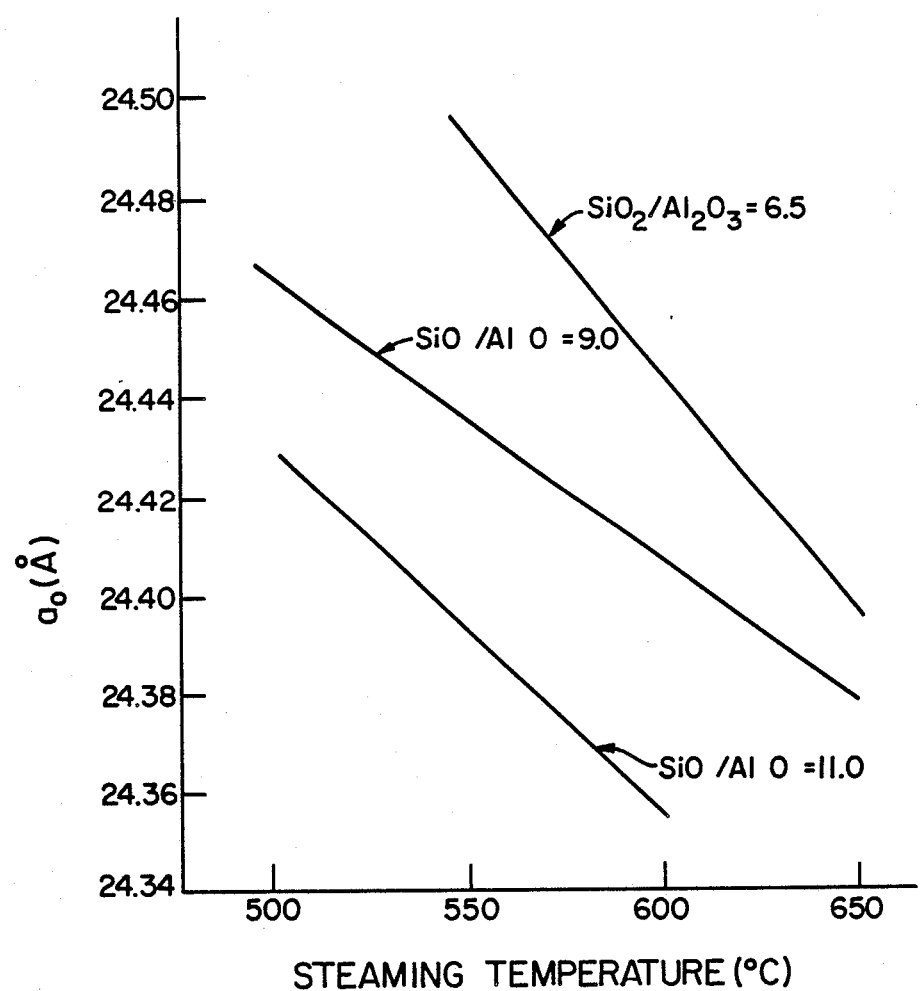
FIG. 4 is a graph showing the variation in unit cell dimension of the steamed product of the process of the present invention with steaming temperature.

FIG. 4 shows the relationship between steaming temperature and unit cell dimension of the steamed zeolite product for all the Examples set forth in Tables VI and VII above, for LZ-210 zeolite starting materials having various initial silica/alumina ratios. From FIG. 4, it will be seen that, in general, the higher the steaming temperature, the lower the unit cell dimension of the steamed zeolite; attainment of unit cell dimensions in the steamed zeolite in the range of 24.38–24.41 Å require steaming temperatures of 600° C. or higher. However, such high steaming temperatures increase $\Delta a_o$, and thus decrease RON. Accordingly, both hydrocracking activity and RON cannot be optimized simultaneously. In fact, as set forth above, in the practice of the present invention, it is preferred to use an LZ-210 zeolite with a high silica/alumina ratio (and thus a low $a_o$), so as to be able to achieve a steamed zeolite with a unit cell dimension close to 24.41 Å and a minimum $\Delta a_o$.

We claim:

1. A process for hydrocarbon conversion if a hydrocarbon feedstock under conditions effective to cause hydrocracking of said feedstock and thereby to produce lower boiling hydrocarbons which comprises contacting said hyrocarbon feedstock in the presence of hydrogen with a catalyst comprising: (1) a zeolitic aluminosilicate which has an SiO$_2$/Al$_2$O$_3$ molar ratio of at least 6, said aluminosilicate having been treated by (i) thermal treatment at an effective temperature and for an effective time in the presence of steam, followed by (ii) ion-exchange with a solution containing ammonium ion; and (2) an effective amount of a hydrogenation component, said catalyst possessing ion exchange sites which are essentially free of rare earth cations.

2. A process according to claim 1 wherein the zeolitic aluminosilicate has a mole ratio of oxides in the anhydrous state of $$(0.85-1.1) M_{2/n}O:Al_2O_3:x SiO_2$$

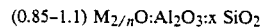

wherein M is a cation having a valence of "n"; "x" has a value greater than 6.0, the zeolite aluminosilicate having an X-ray powder diffraction pattern having at least the d-spacings of Table A and having extraneous silicon atoms in the crystal lattice in the form of framework SiO$_4$ tetrahedra.

3. A process according to claim 1 wherein the zeolitic aluminosilicate is thermally treated at a temperature of 400° C. or higher.

4. A process according to claim 3 wherein the zeolitic aluminosilicate is thermally treated at a temperature of 500° C. or higher.

5. A process according to claim 1 wherein the steam is present in air in an amount of at least about 20 percent by volume.

6. A process according to claim 5 wherein the steam is present in air in an amount of at least about 50 percent by volume.

7. A process according to claim 6 wherein the steam is present in air in an amount of at least about 90 percent by volume.

8. A process according to claim 1 wherein the effective amount of hydrogenation component is at least one metal selected from the group consisting of Pt, Pd, Rh, Ru, Ni, W, Mo, Co, Ti, Cr and mixtures thereof.

9. A process according to claim 8 wherein said metal is selected from the group consisting of Pt, Pd, Rh, Ru and mixtures thereof and is present in an amount between about 0.05 weight percent and about 1.5 weight percent.

10. A process according to claim 8 wherein the metal is selected from the group consisting of Ni, W, Mo, Co, Ti, Cr and mixtures thereof and is present in an amount between about 5 and about 30 percent by weight.

11. A process according to claim 2 wherein the zeolitic aluminosilicate is prepared by subjecting a starting zeolite to treatment with fluorosilicate and the zeolite aluminosilicate is defined as having a chemical composition expressed in terms of mole fractions of framework tetrahedra as:

$$[Al_{(a-N)}Si_{b+(N-\Delta z)z}]O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluorosilicate treatment; "$\Delta z$" is the net change in the mole fraction of defect sites in the zeolite framework resulting from the treatment; $[b+(N-\Delta z)]/[a-N]$ has a value greater than 3.0; the change in defect structure factor $\Delta z$ is less than 0.08; the increased silicon content in the framework, $(N-\Delta z)/N$ is at least 0.5; and the cation equivalant expressed as a monovalent cation species, $M+/Al$, is from 0.85 to 1.1.

12. A process according to claim 11 wherein the change in defect structure, $\Delta z$, is less than 0.05.

13. A process according to claim 11 wherein the hydrothermal treatment is carried out in the presence of at least 50 percent steam at a temperature above about 400° C. for a period of at least 0.25 hours.

14. A process according to claim wherein the effective time is greater than 0.1 hour.

15. A process according to claim 14 wherein the effective time is between 0.1 hour and about 10 hours.

16. A hydrocracking process according to claim 1 wherein the effective hydrocracking comditions comprises a hydrocarbon feed boiling above 300? F., a hydrogen to feed ratio of at least 1000 standard cubic feet per barrel, a total process pressure of between about 400 and about 4000 psig, a process temperature of between about 450° F. and 900° F. and a liquid hourly space velocity of between 0.2 and 5.

17. A process according to claim 6 wherein the process temperature is between about 450° F. and about 600° F. and the nitrogen content of the feed is less than 2000 ppm.

18. A process according to claim 17 wherein the hydrocarbon feed boils between about 420° F. and 1200° F.

19. A process according to claim 18 wherein the hydrocarbon feed boils between about 420° F. and 900° F.

20. A process according to claim 15 wherein the hydrocarbon feed has been pretreated in a hydrotreater to reduce the content of sulfur and nitrogen compounds in the liquid product.

21. A process according to claim 2 wherein the zeolitic aluminosilicate is prepared by inserting silicon atoms as $SiO_4$ tetrahedra into the crystal lattice of an aluminosilicate zeolite aluminosilicate by contacting a crystalline zeolite aluminosilicate having a $SiO_2/Al_2O_3$ molar ratio of at least 3 and pore diameters of at least 3 Angstroms with a fluorosilicate salt in an amount of at least 0.0075 moles per 100 grams of the zeolitic aluminosilicate of an anhydrous basis, said fluorosilicate salt being in the form of an aqueous solution having a pH value within the range of 3 to about 7 and brought into contact with the zeolitic aluminosilicate at a rate sufficiently slow to preserve at least 80 percent of the crystallinity of the zeolitic aluminosilicate.

22. A process according to claim 21 wherein the crystalline zeolite aluminosilicate is at least partially in the ammonium cationic form.

23. A process according to claim 22 wherein the fluorosilicate salt is ammonium fluorosilicate.

24. A process according to claim 1 wherein the crystalline zeolitic aluminosilicate is a Y zeolite having an $SiO_2/Al_2O_3$ molar ratio of at least about 9 and a unit cell dimension $(a_o)$ of less than about 24.55 Å, and wherein the steam treatment is carried out for a period sufficient to cause a decrease of not more than about 0.1Å in the unit cell dimension, thereby producing a Y zeolite product having a $SiO_2/Al_2O_3$ molar ratio of at least about 9 and a unit cell dimension of less than about 24.45 Å.

25. A process according to claim 1 wherein the hydrogenation component comprises one or more Group VIB metal components or one or more non-noble Group VIII metal components.

26. A process according to claim 25 wherein the hydrogenation component comprises at least one metal selected from the group consisting of nickel and cobalt, and at least one metal selected from the group consisting of tungsten and molybdenum.

27. A process according to claim 26 wherein said metals comprise nickel and tungsten.

28. A process according to claim 27 wherein the nickel and tungsten are present in the catalyst in amounts of from about 2 to about 8 weight percent nickel (as NiO) and from about 15 to about 25 weight percent tungsten (as $WO_3$), based upon the weight of the steam-treated, ion-exchanged zeolitic aluminosilicate.

29. A process for hydrocarbon conversion of a hydrocarbon feedstock under conditions effective to cause hydrocracking of said feedstock and thereby to produce lower boiling hydrocarbons which comprises contacting said hydrocarbon feedstock in the presence of hydrogen with a catalyst comprising: (1) a zeolitic aluminosilicate which has an $SiO_2/Al_2O_3$ molar ratio of at least 9 and a unit cell deminsion $(a_o)$ of less than about 24.55 Å, said aluminosilicate having been treated by (i) thermal treatment at an effective temperature in the presence of steam for a period sufficient to cause a decrease of not more than about 0.1 Å in the unit cell dimension, followed by (ii) ion-exchange with a solution containing ammonium ion, thereby producing a Y zeolite product having a SiO$_2$/Al$_2$O$_3$ molar ratio of at least about 9 and a unit cell dimension of less than about 24.45 Å; and (2) an effective amount of a hydrogenation component, said catalyst possessing ion exchange sites which are essentially free of rare earth cations.

30. A process according to claim 29 wherein the Y zeolite product has a unit cell dimension of less than about 24.435 Å.

31. A process according to claim 29 wherein the decrease in the unit cell dimension during the steam treatment is not greater than about 0.08 Å.

32. A process according to claim 29 wherein the Y zeolite material has an SiO$_2$/Al$_2$O$_3$ molar ratio in the range of from about 9 to about 12.

33. A process according to claim 29 wherein the steamed zeolite has a unit cell dimension of not more than about 24.41 Å.

34. A process according to claim 33 wherein the Y material has an SiO$_2$/Al$_2$O$_3$ molar ratio (R) such that:

$$a_p \geq 24.5614 - 0.0167R$$

where $a_p$ is the unit cell dimension of the steamed product.

35. A process according to claim 29 wherein the steam treatment has been conducted at a temperature not greater than about 600° C.

36. A process according to claim 35 wherein the steam treatment has been conducted at a temperature not greater than about 500° C.

37. A process according to claim 29 wherein the steam treatment has been continued for a period of at least about 30 minutes.

38. A process according to claim 29 wherein the Y zeolitic aluminosilicate material is:

(i) a crystalline aluminosilicate having an X-ray powder diffraction pattern having at least the d-spacings set forth in the following Table:

| d (Å) | Relative Intensity |
|---|---|
| 15.8 ± 0.2 | Strong |
| 6.0 ± 0.1 | Medium |
| 5.8 ± 0.1 | Medium weak |
| 4.6 ± 0.1 | Medium |
| 4.4 ± 0.1 | Medium |
| 4.3 ± 0.1 | Medium |
| 3.9 ± 0.1 | Medium |
| 3.66 ± 0.1 | Medium |
| 3.48 ± 0.1 | Medium |
| 3.28 ± 0.1 | Medium |
| 3.18 ± 0.1 | Medium |
| 3.07 ± 0.1 | Medium |
| 2.91 ± 0.1 | Medium | and having at least some of its original framework aluminum atoms replaced by extraneous silicon atoms and having the chemical composition

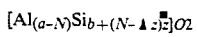

wherein Al$_{(a-N)}$ represents the mole fraction of aluminum tetrahedra in the product zeolite; "a" represents the mole fraction of aluminum tetrahedra in the original zeolite; "N" represents the mole fraction of aluminum tetrahedra removed from the original zeolite, and has a value of at least 0.3a; Si$_{b+(N-\blacktriangle z)}$ represents the mole fraction of silicon tetrahedra in the product zeolite; "b" represents the mole fraction of silicon tetrahedra in the original zeolite; (N−▲z) represents the mole fraction of silicon tetrahedra resulting from the substitution of extraneous silicon into the crystal lattice; "■" represents framework defect sites; "▲z" represents the difference between the mole fraction of framework defect sites of the original zeolite and the zeolite containing the extraneous silicon atoms and has a value of less than 0.08; (N−▲z)/N has a value at least as great as 0.5; and [b+(N−▲z)](a−N) has a value of at least 4.0;

(ii) a crystalline zeolite aluminosilicate having at least some of its original framework aluminum atoms replaced by extraneous silicon atoms and having a mole ratio of oxide in the anhydrous state of $$(0.85-1.1)M_{2/n}O:Al_2O_3:x\,SiO_2$$

wherein M is a cation having a valence of "n"; "x" has a value greater than 6.0; has an X-ray powder diffraction pattern having at least the d-spacings set forth in the following Table:

| d (Å) | Relative Intensity |
|---|---|
| 14.22–13.97 | very strong |
| 8.71–8.55 | medium |
| 7.43–7.30 | medium |
| 5.66–5.55 | strong |
| 4.75–4.66 | medium |
| 4.36–4.28 | medium |
| 3.75–3.69 | strong |
| 3.30–3.23 | strong |
| 2.85–2.79 | strong | and having extraneous silicon atoms in the crystal lattice in the form of framework SiO$_4$ tetrahedra;

(iii) a crystalline zeolite aluminosilicate having at least some of its original framework aluminum atoms replaced by extraneous silicon atoms and having the chemical composition

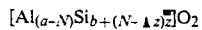

wherein Al$_{(a-N)}$ represents the mole fraction of aluminum tetrahedra; "a" represents the mole fraction of aluminum tetrahedra in the original zeolite; "N" represents the mole fraction of aluminum tetrahedra removed from the original zeolite; Si$_{b+(N-\blacktriangle z)}$ *represents the mole fraction of silicon tetrahedra;* "b" *represents the mole fraction of silicon tetrahedra in the original zeolite;* (N−▲z) *represents the mole fraction of silicon tetrahedra resulting from the substitution of extraneous silicon into the crystal lattice;* "▲z" *represents the difference in the Defect Structure Factor between the original zeolite and the zeolite containing the extraneous silicon atoms and has a value of less than* 0.08; (N−▲z)/N has a value of at least 0.5; "■" represent defect sites; "z" represents the mole fraction of defect sites:

$$[b+(N-\blacktriangle z)]/(a-N)$$

has a value of at least 3.0, and the aluminosilicate has an X-ray powder diffraction pattern having at least the d-spacings of the following Table:

| d (Å) | Relative Intensity |
|---|---|
| 14.22–13.97 | very strong |
| 8.71–8.55 | medium |

| d (Å) | Relative Intensity |
|---|---|
| 7.43–7.30 | medium |
| 5.66–5.55 | strong |
| 4.75–4.66 | medium |
| 4.36–4.28 | medium |
| 3.75–3.69 | strong |
| 3.30–3.23 | strong |
| 2.85–2.79 | strong |

(iv) a zeolitic aluminosilicate having a cubic crystalline structure which in the anhydrous state composition is expressed in terms of mole ratios of oxides $(0.85-1.1)M_{2/n}O: Al_2O_3 \cdot xSiO_2$ wherein M is a cation having a valence of "n"; and "x" has a value greater than 8, having an X-ray powder diffraction pattern having at least the d-spacings of the following Table:

| d (Å) | Relative Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong | and having extraneous silicon atoms in its crystalline lattice in the form of $SiO_4$, tetrahedra; or (iv) a crystalline zeolite aluminosilicate having at least some of its original framework aluminum atoms replaced by extraneous silicon atoms and having the chemical composition $[Al_{(a-N)}Si_{b+(N-\Delta z)z}]O_2$ wherein $Al_{(a-N)}$ represents the mole fraction of aluminum tetrahedra; "a" represents the mole fraction of aluminum tetrahedra in the original zeolite; "N" represents the mole fraction of aluminum tetrahedra removed from the original zeolite, and has a value of at least 0.3a; $Si_{b+(N-\Delta z)}$ represents the mole fraction of silicon tetrahedra; "b" represents the mole fraction of silicon tetrahedra in the original zeolite; $(N-\Delta z)$ represents the mole fraction of silicon tetrahedra resulting from the substitution of extraneous silicon into the crystal lattice; "$\Delta z$" represents the difference in the Defect Structure Factor between the original zeolite and the zeolite containing the extraneous silicon atoms and has a value of less than 0.08; $(N-\Delta z)/N$ has a value at least as great as 0.5; "z" represents the mole fraction of defect sites:

$[b+(N-\Delta z)]/(a-N)$ has a value of at least 4.0, and the aluminosilicate has a cation equivalent expressed as monovalent cation species $M^+/Al$ of from 0.85 to 1.1; and has an X-ray powder diffraction pattern having at least the d-spacings of the following Table:

| d (Å) | Relative Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

39. A process according to claim 29 wherein the steamed, ammonium-exchanged aluminosilicate contains, on average, not more than about 10 atoms of non-framework aluminum per unit cell.

40. A process according to claim 29 wherein the effective amount of hydrogenation component is at least one metal selected from the group consisting of Pt, Pd, Rh, Ru, Ni, W, Mo, Co, Ti, Cr and mixtures thereof.

41. A process according to claim 40 wherein said metal is selected from the group consisting of Pt, Pd, Rh, Ru and mixtures thereof and is present in an amount between about 0.05 weight percent and about 1.5 weight percent.

42. A process according to claim 40 wherein the metal is selected from the group consisting of Ni, W, Mo, Co, Ti, Cr and mixtures thereof and is present in an amount between about 5 and about 30 percent by weight.

43. A hydrocracking process according to claim 29 wherein the effective hydrocracking conditions comprise a hydrocarbon feed boiling above 300° F., a hydrogen to feed ratio of at least 1000 standard cubic feet per barrel, a total process pressure of between about 400 and about 4000 psig, a process temperature of between about 450° F. and 900° F. and a liquid hourly space velocity of between 0.2 and 5.

44. A process according to claim 43 wherein the process temperature is between about 450° F. and about 600° F. and the nitrogen content of the feed is less than 2000 ppm.

45. A process according to claim 44 wherein the hydrocarbon feed boils between about 420° F. and 1200° F.

46. A process according to claim 45 wherein the hydrocarbon feed boils between about 420° F. and 900° F.

47. A process according to claim 29 wherein the hydrocarbon feed has been pretreated in a hydrotreater to reduce the content of sulfur and nitrogen compounds in the liquid product.

48. A process according to claim 29 wherein the zeolitic aluminosilicate is prepared by inserting silicon atoms as $SiO_4$ tetrahedra into the crystal lattice of an aluminosilicate zeolitic aluminosilicate by contacting a crystalline zeolite aluminosilicate having a $SiO_2/Al_2O_3$ molar rato of at least 3 and pore diameters of at least 3 Angstroms with a fluorosilicate salt in an amount of at least 0.0075 moles per 100 grams of the zeolitic aluminosilicate on an anhydrous basis, said fluorosilicate salt being in the form of an aqueous solution having a pH value within the range of 3 to about 7 and brought into contact with the zeolite aluminosilicate at a rate sufficiently slow to preserve at least 80 percent of the crystallinity of the starting zeolitic aluminosilicate.

49. A process according to claim 48 wherein the starting crystalline zeolitic aluminosilicate is at least partially in the ammonium cationic form.

50. A process according to claim 49 wherein the fluorosilicate salt is ammonium fluorosilicate.

51. A process according to claim 29 wherein the hydrogenation component comprises one or more Group VIB metal components or one or more non-noble Group VIII metal components.

52. A process according to claim 51 wherein the hydrogenation component comprises at least one metal selected from the group consisting of nickel and cobalt, and at least one metal selected from the group consisting of tungsten and molybdenum.

53. A process according to claim 52 wherein said metals comprise nickel and tungsten.

54. A process according to claim 53 wherein the nickel and tungsten are present in the catalyst in amounts of from about 2 to about 8 weight percent nickel (as NiO) and from about 15 to about 25 weight percent tungsten (as $WO_3$), based upon the weight of the steam-treated, ion-exchanged zeolitic aluminosilicate.

* * * * *